(12) United States Patent
Nguyen et al.

(10) Patent No.: US 6,179,130 B1
(45) Date of Patent: Jan. 30, 2001

(54) FAUCET SPOUT ASSEMBLY

(75) Inventors: Jack T. Nguyen, Ontario; Donald J. Segien, Chatsworth, both of CA (US)

(73) Assignee: Emhart Inc., Newark, DE (US)

( * ) Notice: Under 35 U.S.C. 154(b), the term of this patent shall be extended for 0 days.

(21) Appl. No.: 08/907,455

(22) Filed: Aug. 8, 1997

(51) Int. Cl.$^7$ .................................................. E03C 1/04
(52) U.S. Cl. .......................... 210/424; 4/678; 137/801; 239/575
(58) Field of Search ................................ 4/678; 137/801; 239/553.5, 575; 210/422, 424

(56) References Cited

U.S. PATENT DOCUMENTS

| | | |
|---|---|---|
| D. 368,956 * | 4/1996 | Haug et al. . |
| 953,637 | 3/1910 | McCollom . |
| 966,181 | 8/1910 | Durbrow . |
| 1,078,939 | 11/1913 | Miller et al. . |
| 1,934,159 * | 11/1933 | Auberschek . |
| 2,019,319 * | 10/1935 | Robinovitz . |
| 2,392,319 | 1/1946 | Harwood . |
| 3,144,878 * | 8/1964 | Williams .......................... 137/801 X |
| 3,190,312 * | 6/1965 | Classen et al. ................... 137/625.4 |
| 3,504,703 | 4/1970 | Bozoyan . |
| 3,595,474 | 7/1971 | Humpert . |
| 3,780,869 | 12/1973 | Krongos . |
| 3,822,018 | 7/1974 | Krongos . |
| 4,107,046 | 8/1978 | Corder . |
| 4,172,796 | 10/1979 | Corder . |
| 4,378,029 * | 3/1983 | Parkison . |
| 4,379,053 | 4/1983 | Brane . |
| 4,504,389 | 3/1985 | Rundzaitis . |
| 4,522,373 * | 6/1985 | Shelbourn et al. .................. 251/297 |
| 4,686,037 | 8/1987 | Lang . |
| 4,770,768 | 9/1988 | Lang . |
| 4,805,245 | 2/1989 | Herring . |
| 4,863,103 | 9/1989 | Gannaway . |
| 4,980,073 | 12/1990 | Woodruff . |
| 5,056,562 | 10/1991 | Pawelzik et al. . |
| 5,102,543 | 4/1992 | Burroughs . |
| 5,126,041 | 6/1992 | Weber et al. . |
| 5,127,427 | 7/1992 | Kajpust et al. . |
| 5,151,179 | 9/1992 | Bach et al. . |
| 5,158,234 * | 10/1992 | Magnenat et al. ................... 4/678 X |
| 5,192,436 | 3/1993 | Sasaki et al. . |

(List continued on next page.)

FOREIGN PATENT DOCUMENTS

| | | |
|---|---|---|
| 621614 * | 2/1981 | (CH) . |
| 633059 A5 | 11/1982 | (CH) . |
| 0446365A1 | 9/1991 | (EP) . |
| 4-216729 | 8/1992 | (JP) . |
| WO91-07614 | 5/1991 | (WO) . |

OTHER PUBLICATIONS

Abstract of Japanese Publication No. 7–098068, Published Nov. 4, 1995.

Primary Examiner—Gerald A. Michalsky
(74) Attorney, Agent, or Firm—Harold Weinstein; John D. Del Ponti

(57) ABSTRACT

A faucet 40 includes a faucet spout assembly 46 which includes a spout shell 56 for supporting a cartridge 126 containing a filter media therein defining a flow path for water being filtered. The shell 56 and the cartridge 126 define a flow space 138 between the shell and the cartridge for unfiltered water. Water which flows through the flow path of the filter cartridge 126, and unfiltered water which flows through the flow space 138, is directed to a chamber 158 of a valve head 60. A spool valve 210 is located within the chamber 158 and is positionable selectively by manipulation of a knob 62 to allow the filtered water or the unfiltered water to enter the chamber, and to allow the filtered water to be dispensed from the spout assembly 46 through a nozzle 66 or, alternatively, the unfiltered water to be dispensed from an aerator 64.

15 Claims, 14 Drawing Sheets

U.S. PATENT DOCUMENTS

| | | |
|---|---|---|
| 5,510,031 | 4/1996 | Knauf, Jr. et al. . |
| 5,525,214 | 6/1996 | Hembree . |
| 5,527,451 | 6/1996 | Hembree et al. . |
| 5,545,322 | 8/1996 | Cheng . |
| 5,634,220 | 6/1997 | Chiu . |
| 5,699,832 * | 12/1997 | Burchard et al. ............... 137/801 X |
| 5,744,033 * | 4/1998 | Bertrand et al. ............. 137/625.5 X |
| 5,823,229 * | 10/1998 | Bertrand et al. ............... 137/801 X |
| 5,989,425 * | 11/1999 | Yonezawa et al. ............. 210/424 X |

* cited by examiner

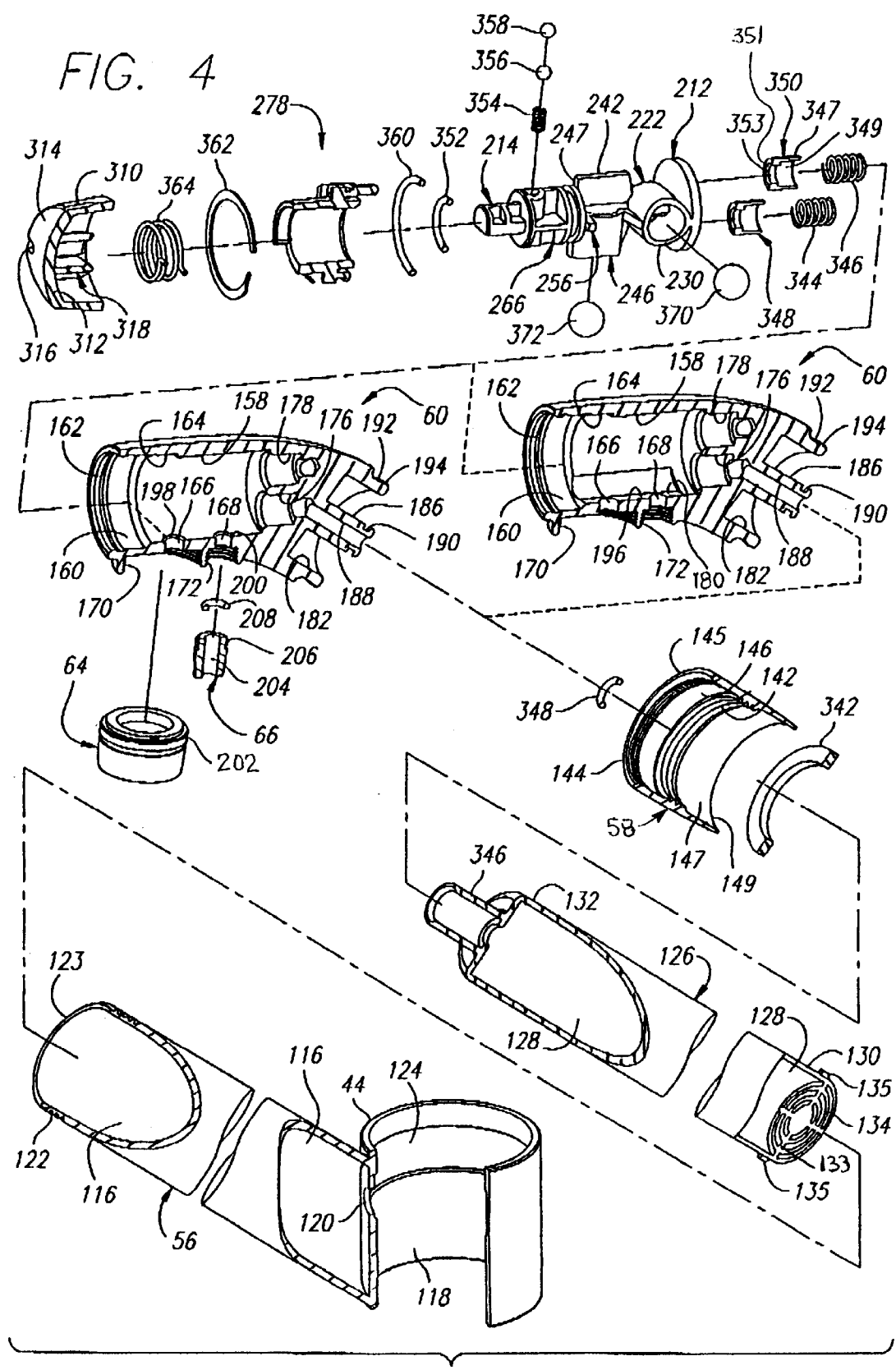

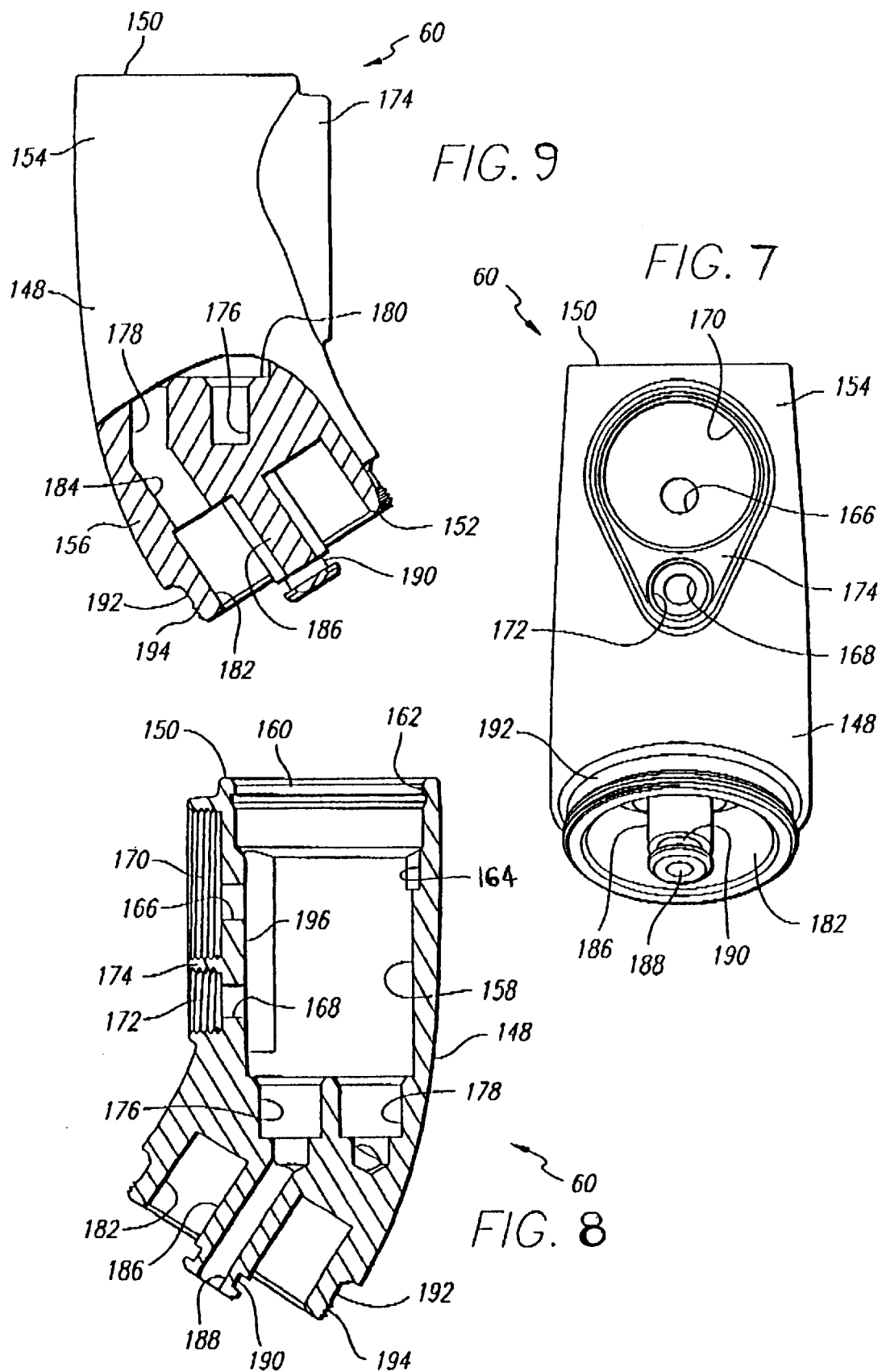

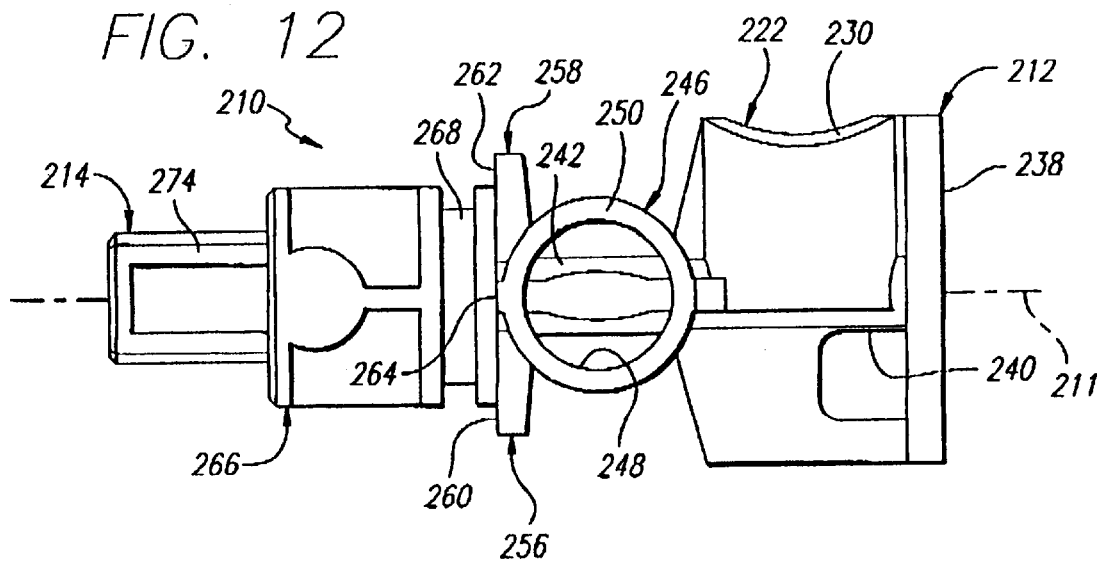
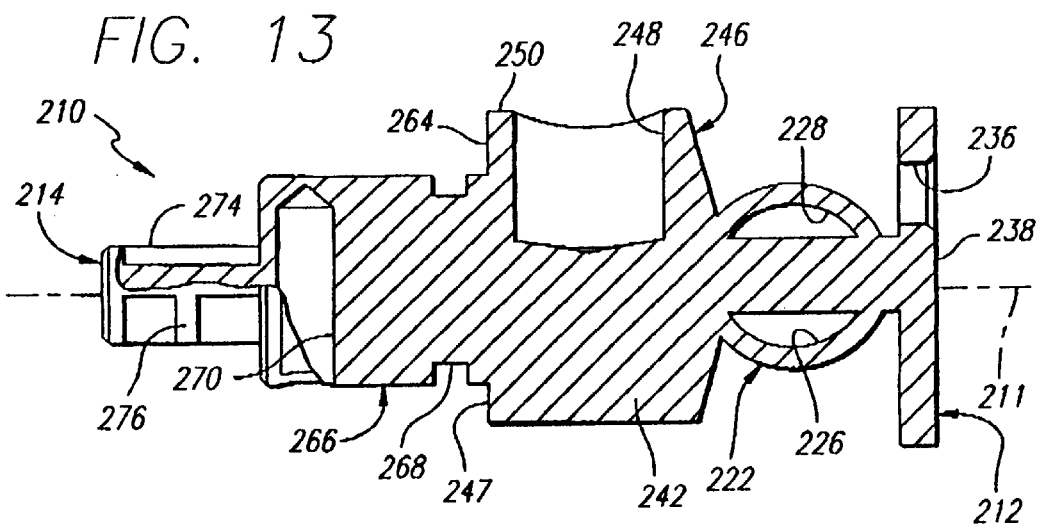
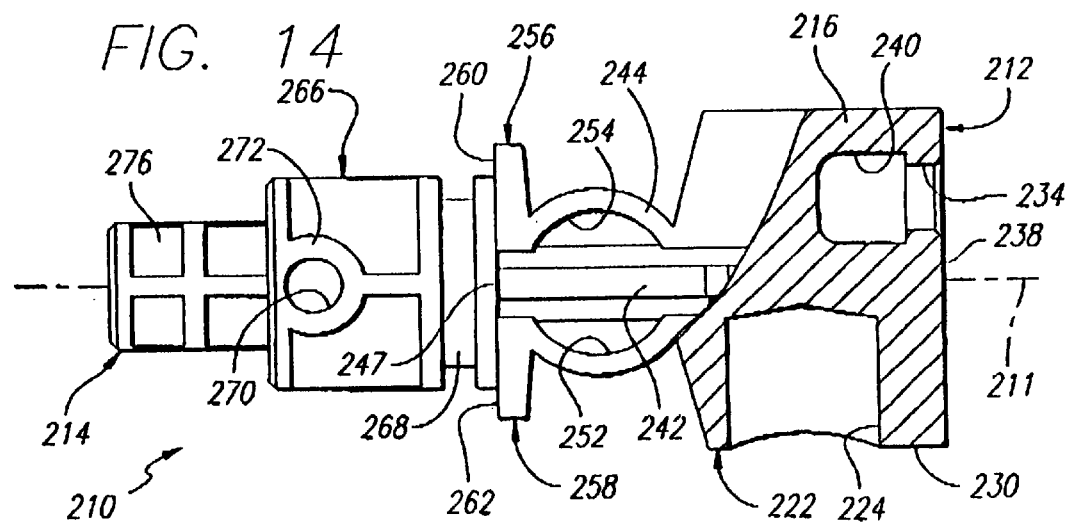

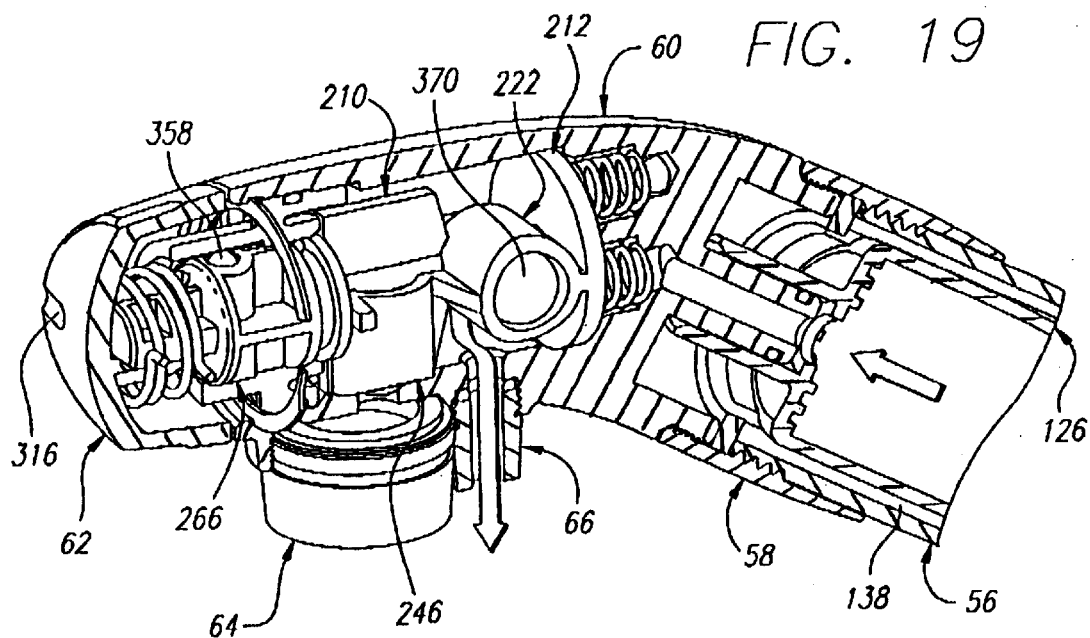
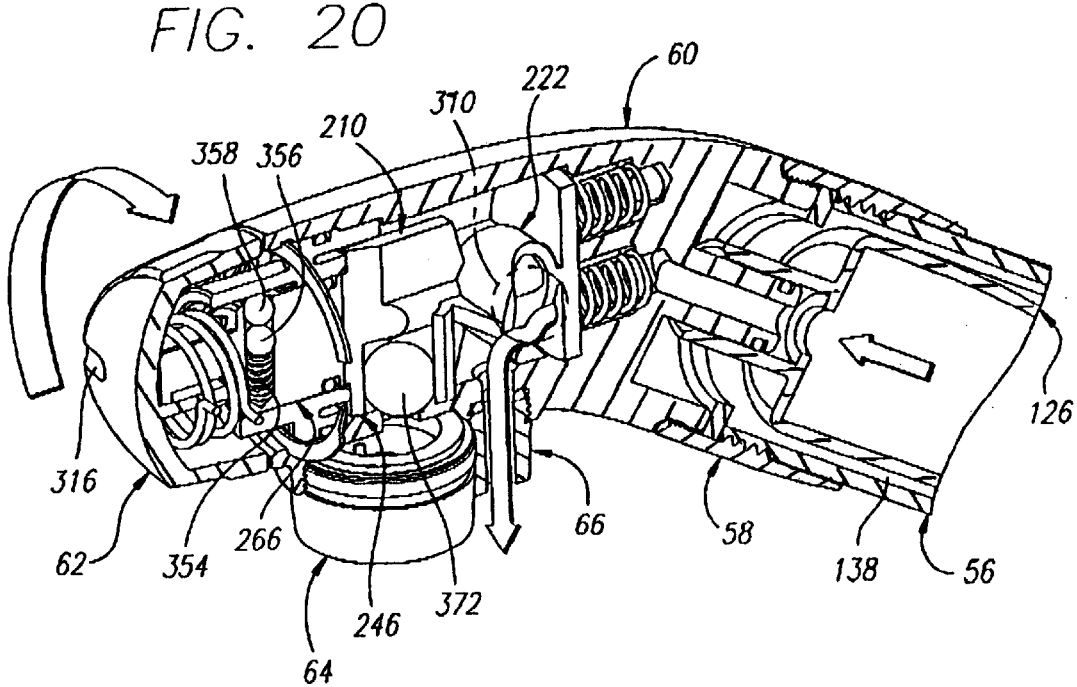

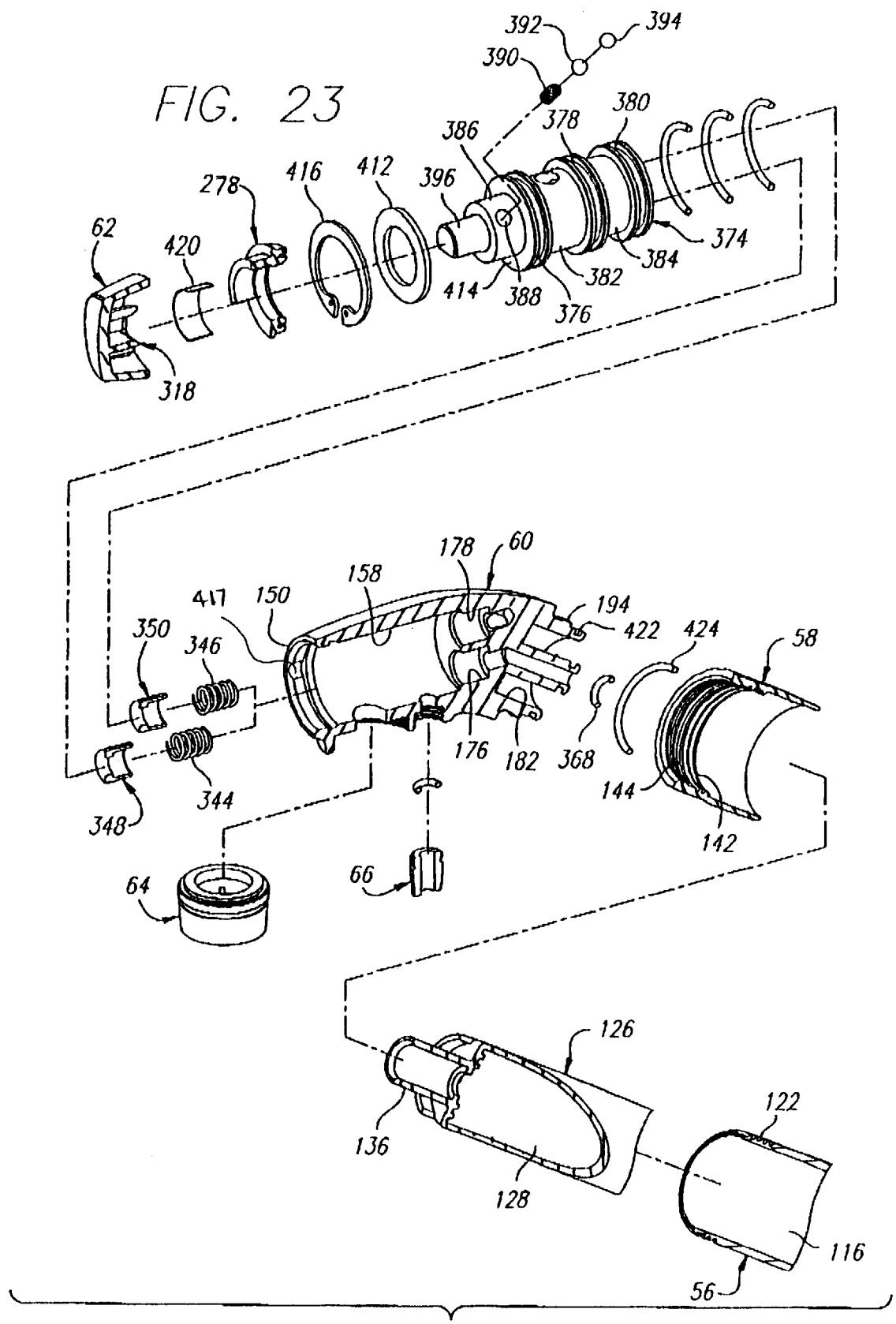

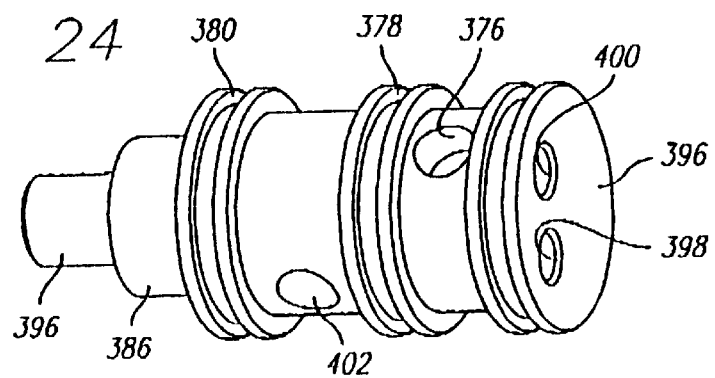
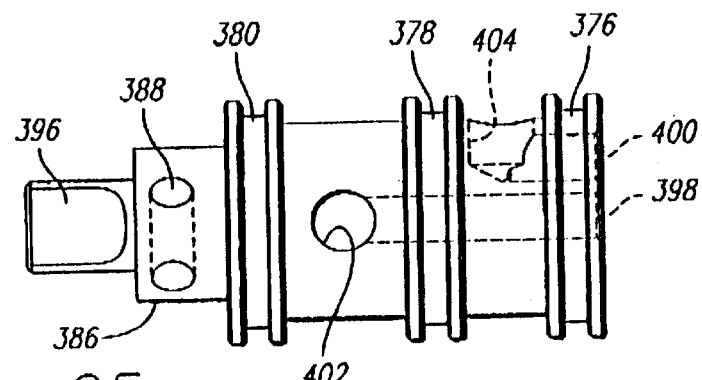
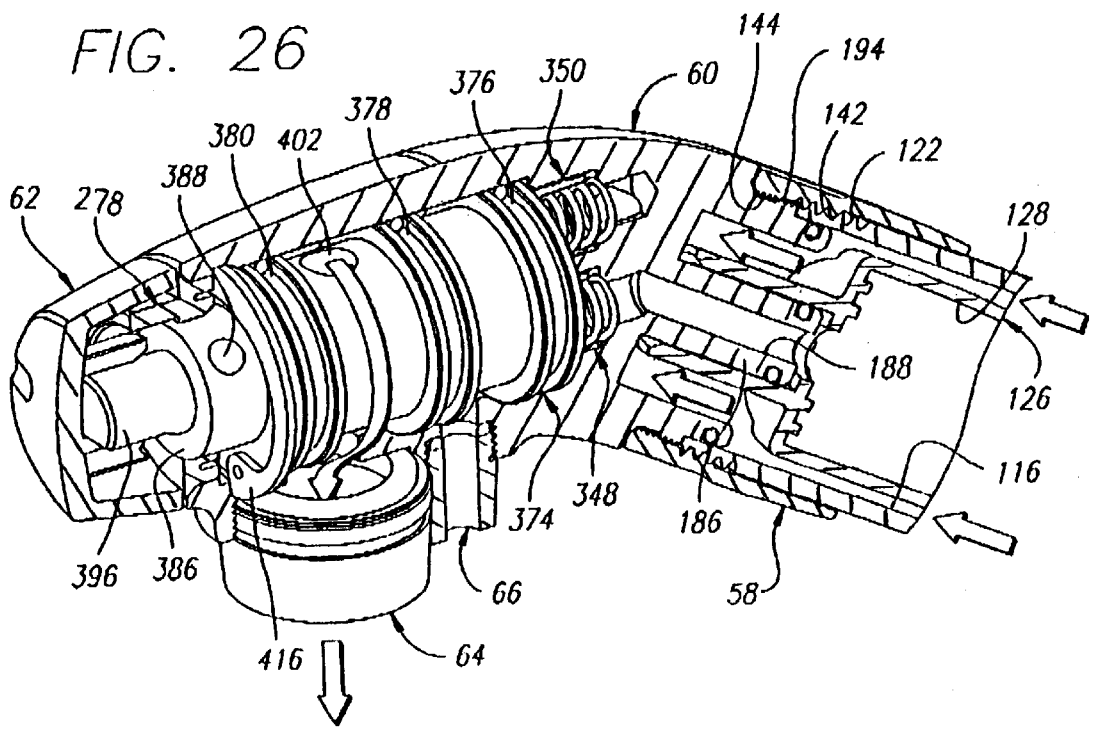

FAUCET SPOUT ASSEMBLY

BACKGROUND OF THE INVENTION

This invention relates to a faucet spout assembly, and particularly relates to a spout assembly of a faucet which contains a valve for selectively directing fluid through one of a pair of spout outlets.

Several systems have been developed in the past for filtering water prior to, or after, the passage of the water through a faucet for point-of-use dispensing. One such system includes a bulky canister type filter with a cartridge having a filtering media contained therein. Upon the demand for water at the faucet by an operator of a faucet valve, water passes through the filtering media in the canister and then through the faucet and is dispensed at the outlet of the spout. Typically, filters of this type are located in a storage cabinet beneath the sink where the faucet is located. At times, the canisters are difficult to access when it becomes necessary to change the filter cartridge. Also, filters of this type are located, in the water flow path, upstream of the faucet valve thereby necessitating the placement of a separate water shut-off valve adjacent the canister to turn the water off in order to replace the filter cartridge. Otherwise, the main water supply valve must be turned off during the replacement process.

Another type of water filtering unit is referred to as a counter-top unit which sets on the counter top in the vicinity of the faucet. Such units require additional plumbing lines to connect into the flow path. In addition, the counter-top units are bulky, unattractive and require considerable space in the area of the faucet and sink.

A third type of water filtering unit is referred to as an aerator-mounted unit which is assembled with the faucet system at the free end of the spout in place of the aerator. These units are unusually large and unattractive, and tend to interfere with normal use of the sink in the vicinity of the faucet and spout.

Therefore, there is a need for a water filtering system which accomplishes the water filtering task without affecting the aesthetics of the faucet, and which mounts the filtering facility in an easily accessible and convenient location for replacing filter cartridges. Further, there is a need for a water filtering system which is structurally designed to facilitate the replacement of the cartridges without the need for tools, and for a readily accessible valving facility for the fast and efficient selection of filtered or unfiltered water to be dispensed from the spout of the faucet.

SUMMARY OF THE INVENTION

It is, therefore, an object of this invention to provide a water filtering system for use with a faucet which is concealed and does not affect the aesthetics of the faucet.

Another object of this invention is to provide a water filtering system which is in an easily accessible and convenient location for replacing filter cartridges of the system in a most efficient manner.

Still another object of this invention is to provide a structural mount for a filtering system which facilitates replacement of a filter cartridge without the need for tools.

A further object of this invention is to provide a readily accessible valving facility for the fast and efficient selection of filtered or unfiltered water to be dispensed from the spout of a faucet upon demand.

With these and other objects in mind, this invention contemplates a faucet spout assembly which includes a spout and a two-position valve mounted within the spout. The faucet valve assembly further includes a selector mechanism for positioning the valve in a selected one of two positions to facilitate the directing of fluid from the spout to a selected one of two outlets thereof.

This invention further contemplates at least two fluid-flow paths through the spout with one of the paths being connectable selectively to one of the two outlets of the spout and the other of the two paths being connectable selectively to the other of the two outlets of the spout.

This invention also contemplates mounting structure within a spout of a faucet for supporting a filter media therein whereby fluid to be dispensed from the spout can be selected from fluid flowing through the filter media within the spout or outside of the filter media within the spout.

Additionally, this invention contemplates mounting structure within a spout of a faucet for supporting a filter cartridge therein whereby the mounting structure can be easily disassembled to facilitate the placement of the filter cartridge within, or removal of the filter cartridge from within, the spout.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 3 is a sectional assembly view showing the single control valve of the faucet of FIG. 1;

FIG. 4 is an exploded perspective view showing a first embodiment of a spout valve assembly mountable in a spout of the faucet of FIG. 1 in accordance with certain principles of the invention, and showing a filter cartridge mountable in the spout also in accordance with certain principles of the invention;

FIG. 7 is a bottom view showing a valve head which forms a portion of the spout of FIG. 4 in accordance with certain principles of the invention;

FIG. 8 is a sectional view showing the valve head of FIG. 7 in accordance with certain principles of the invention;

FIG. 9 is a partial sectional view showing the valve head of FIG. 7 in accordance with certain principles of the invention;

FIG. 12 is a full view showing the valve spool of FIG. 10 in accordance with certain principles of the invention;

FIG. 13 is a sectional view showing the valve spool of FIG. 10 in accordance with certain principles of the invention;

FIG. 14 is a partial sectional view showing the valve spool of FIG. 10 in accordance with certain principles of the invention;

FIG. 19 is a perspective sectional view showing the path of filtered water through the assembled spout valve assembly of FIG. 4 in accordance with certain principles of the invention;

FIG. 20 is a perspective sectional view with parts broken away showing the path of filtered water through the assembled spout valve assembly of FIG. 4 in accordance with certain principles of the invention;

FIG. 23 is an exploded perspective view showing a second embodiment of a spout valve assembly mountable in the spout of the faucet of FIG. 1 in accordance with certain principles of the invention;

FIG. 24 is a perspective view showing a valve spool of the spout valve assembly of FIG. 23 in accordance with certain principles of the invention;

FIG. 25 is a side view showing the valve spool of FIG. 24 in accordance with certain principles of the invention;

FIG. 26 is a perspective sectional view showing the path of unfiltered water through the assembled spout valve assembly of FIG. 23 in accordance with certain principles of the invention;

DETAILED DESCRIPTION OF THE PREFERRED EMBODIMENT

Figure 1:
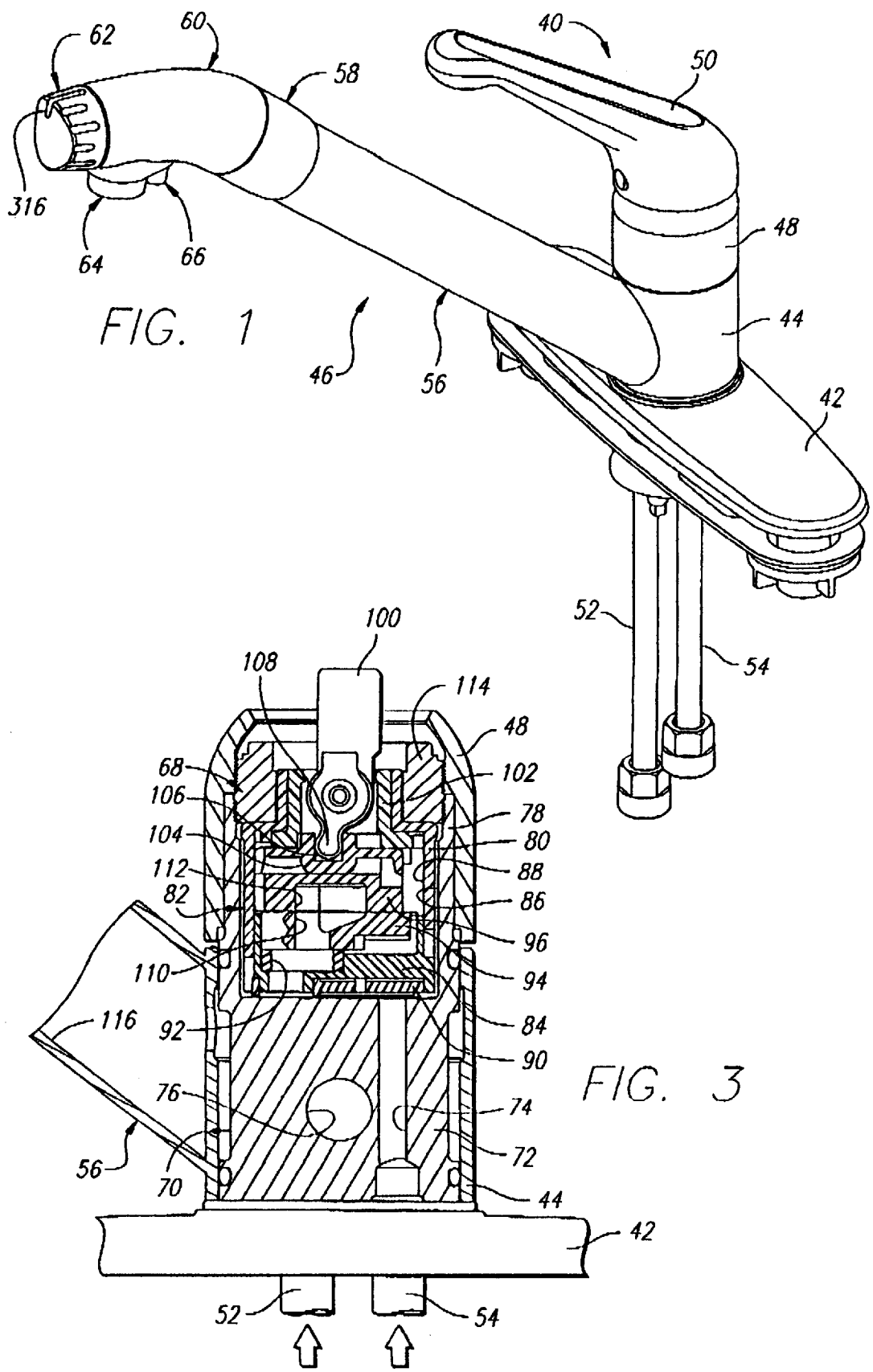
FIG. 1 is a perspective view showing a faucet having a single control faucet valve.
Figure 2:
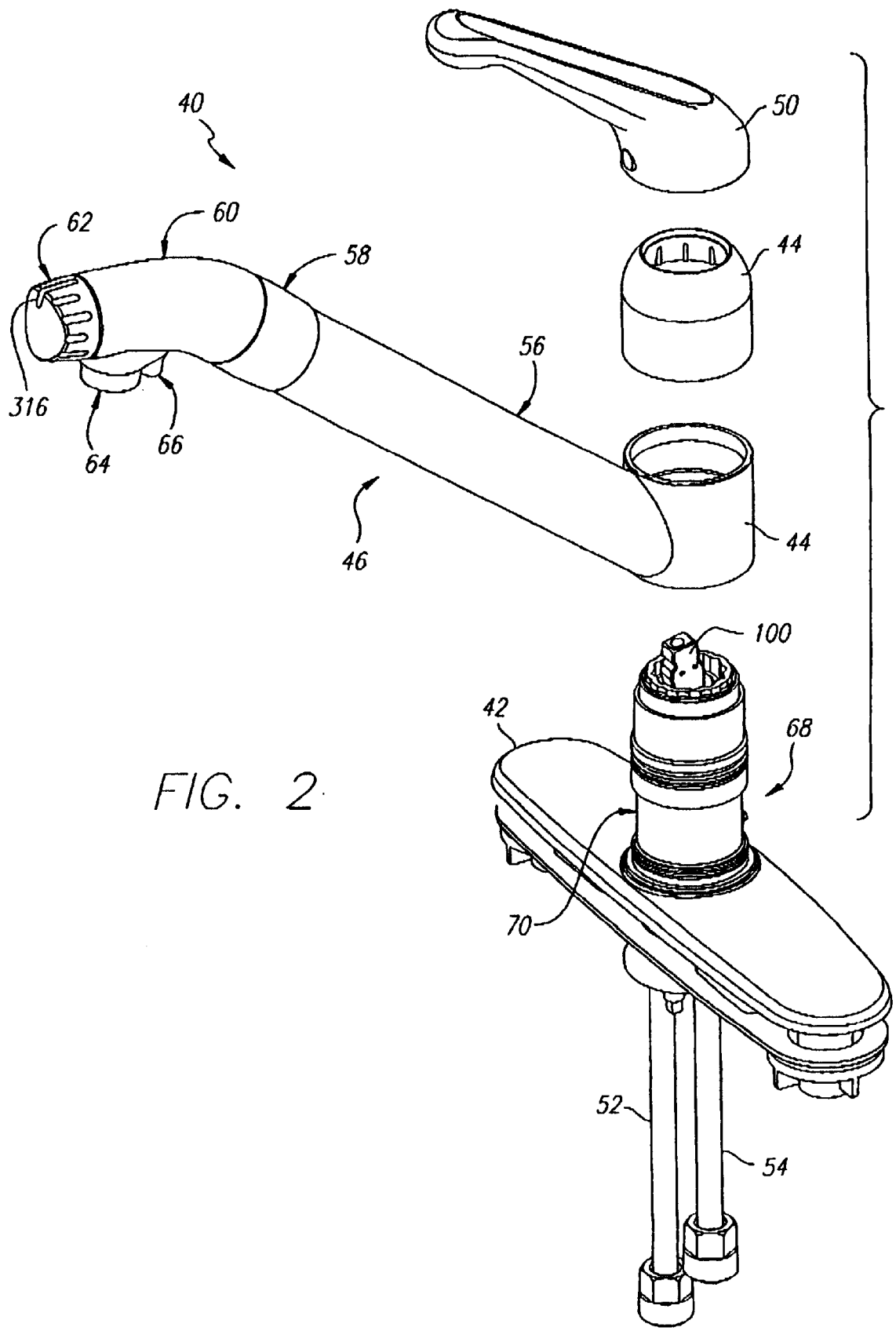
FIG. 2 is an exploded perspective view showing separable elements of the faucet of FIG. 1.

As illustrated in FIGS. 1 and 2, a single control faucet 40 includes facility for selectively dispensing, on the one hand, treated or filtered water or, on the other hand, untreated or unfiltered water. The faucet 40 includes a base 42, a spout hub 44, a faucet spout assembly 46, a dome 48 and a control handle 50. Inlet conduits 52 and 54 are connected to the underside of the faucet 40 and facilitate the supply of hot water and cold water, respectively, to the faucet. The spout assembly 46 includes a spout shell 56, a connecting nut or coupler 58, a valve head 60 and a selector knob 62, with an unfiltered-water aerator 64 and a filtered-water nozzle 66 suspending from the underside of the valve head.

Referring to FIG. 3, the faucet 40 also includes a valve assembly 68 which is connectable to the handle 50 (FIGS. 1 and 2) to facilitate control of the valve to select the hot and/or cold water for the desired temperature, and the volume, of the water being dispensed from the faucet. The valve assembly 68 includes a brass casing 70 formed with a lower half section 72 which is generally solid except for a pair of inlet passages 74 (one shown) for the hot and cold water, and an outlet passage 76. An upper section 78 of the casing 70 is formed with an open-top receptacle 80 for receipt of a ceramic cartridge valve 82 therein, which is a component of the valve assembly 68. The cartridge valve 82 is of the type described in U.S. Pat. No. 5,402,827, which issued on Apr. 4, 1995, the disclosure of which is incorporated herein by reference thereto.

The cartridge valve 82 includes a disc-shaped base 84 which cooperates with a housing 86 to form a shell 88. A gasket 90 is located on the exterior major face of the base 84 and provides sealed passages on the outboard side of the base. A plurality of seals 92 (one shown) are located on the inboard side of the base 84 to isolate the hot, cold and outlet water passages from each other at that juncture of the cartridge valve 82. One major surface of a fixed ceramic plate 94 is placed on the seals 92 and has a polished major surface in engagement with a polished major surface of a movable ceramic plate 96. A control stem 100 extends outward from an end of the housing 86, which is opposite the end with the base 84, and is pinned to a bushing 102 within the housing for rotary and pivotal movement. A coupler 104 is located between the bushing 102 and the movable plate 96 and is formed with a pocket 106 which receives an inboard end 108 of the stem 100. The movable plate 96, the bushing 102 and the coupler 104, in conjunction with the stem 100, facilitate the selective lateral and/or rotary movement upon selective movement of the stem.

The fixed plate 94 is formed with a hot inlet passage (not shown), a cold inlet passage (not shown) and an outlet passage 110. The movable plate 96 is formed with a mixing chamber 112 which, by selective control of the stem 100, is alignable with the inlet passages and outlet passage 110 of the fixed plate 94 to facilitate the passage of water from the inlet lines 52 and 54, through the valve 68 to the spout assembly 46.

A nut 114, as shown in FIG. 3, is threadedly attached to the inside wall of the upper section 78 of the brass casing 70 to retain the cartridge valve 82 within the receptacle 80. The handle 50 (FIGS. 1 and 2) is mounted on and attached to the stem 100 to provide easy control and movement of the stem and the movable plate 96.

While the above-described faucet 40 is a single control type of faucet, other types of faucets such as, for example, a two handle faucet could be used without departing from the spirit and scope of the invention.

Figure 6:
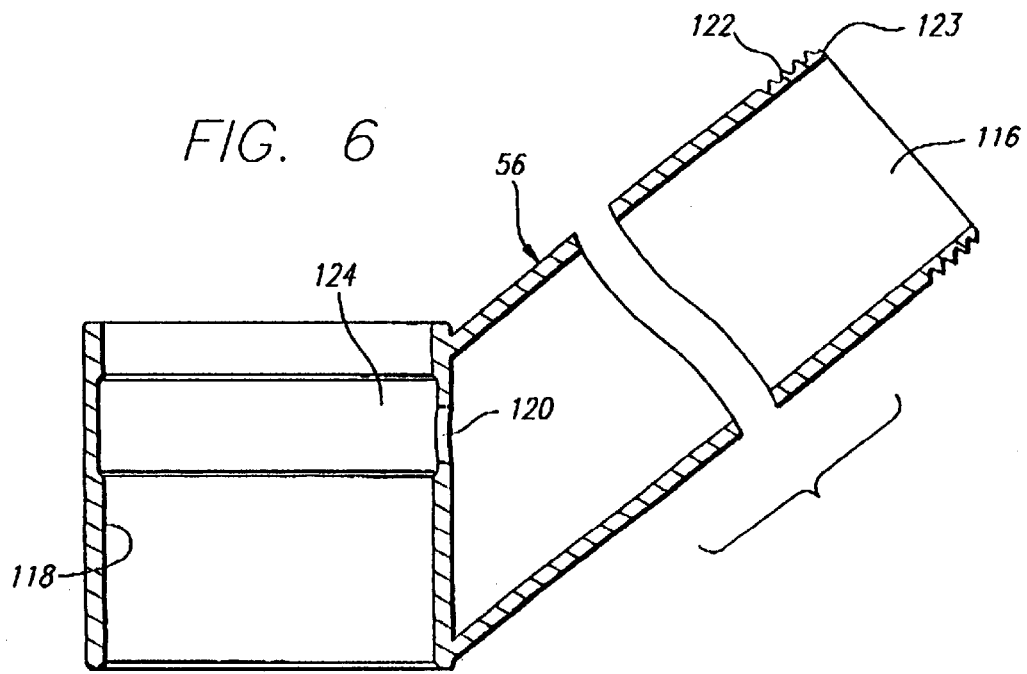
FIG. 6 is a sectional view showing a spout hub and a portion of the spout of FIG. 4 in accordance with certain principles of the invention.

As shown in FIGS. 4 and 6, the spout shell 56 is formed with and extends from the hub 44 and is formed with a tubular opening 116 which communicates with a tubular opening 118 of the hub through a portal 120 (FIG. 6). Right-hand coarse threads 122 are formed on the outer surface of the spout shell 56 at an end 123 opposite the end which is formed with the hub 44. The tubular opening 118 of the hub 44 is formed at a consistent diameter except for a larger diameter in an upper central portion 124, as shown in FIG. 6, which is coincidental with the portal 120.

Referring to FIG. 4, a filter cartridge 126 is formed with a cylindrical section 128 which extends from a first axial end 130 to a second axial end 132 thereof at a prescribed diameter. A cover 134 is located over the mouth of the section 128 at the first axial end 130 thereof and is formed with spaced concentric circular passages 131 defined by concentric circular webs and a plurality of radially arranged spokes 133. The passages of the cover 134 are of sufficient size to allow the passage of water therethrough. The cover 134 is also formed with a plurality of tabs 135 which are located radially around the periphery of the cover. When the cover 134 is assembled with the cylindrical section 128 of the cartridge 126, the tabs 135 extend radially outward from the first axial end 130 as illustrated in FIG. 4. The filter cartridge 126 is formed with a cylindrical nozzle 136 which is of a diameter smaller than the prescribed diameter, and which extends axially away from the section 128. The external diameter of the filter cartridge 126 is smaller than the internal diameter of the spout shell 56 to the extent that, when the cartridge is located within the spout shell, a space 138 (FIG. 5) is defined therebetween.

The nut 58 is formed in a cylindrical configuration with right-hand coarse threads 142 being formed internally about a middle section and with left-hand fine threads 144 being formed internally adjacent an upper end 145 as shown in FIG. 4. The threads 142 and 144 are spaced apart by a prescribed axial distance to define a first unthreaded or non-fastening-structure section 146 internally of the nut 58. A second unthreaded section 147 is formed between the coarse threads 142 and a lower end 149 of the nut 58. It is noted that the right-hand coarse threads 122 of the spout shell 56 match the right-hand coarse threads 142 of the nut 58. It is further noted that the right-hand threads 122 and 142 are considered a first type of fastening structure.

Referring to FIGS. 4, 7, 8 and 9, the valve head 60 is formed with a unitary body 148 having a first end 150 and a second end 152. The body 148 is formed with a first section 154 which extends along a first axis inward from the end 150 for a first prescribed distance. The body 148 is also formed with a second section 156 which extends along a second axis inward from the second end 152 for a second prescribed distance and joins, at an angle, with the first section 154 to form the unitary body 148. The first and second axes form an angle at a juncture thereof which is the same angle at which the first section 154 joins with the second section 156 to form the unitary body 148.

As shown in FIGS. 4 and 7, a large cylindrical chamber or plenum 158 is formed in the first section 154 of the valve head 60 and is formed with an opening 160 at the first end 150 of the head. An annular groove 162 is formed in the wall of the chamber 158 immediately adjacent the opening 160. A small portion of the wall of the chamber 158 is formed with an arcuate slot 164 (FIG. 8) which extends axially for a prescribed distance. A first outlet passage 166 and a second outlet passage 168 are formed radially through the wall of the chamber 158 so that the chamber communicates with a first threaded opening 170 and a second threaded opening 172, respectively, formed in an underbody 174 which extends laterally from the first section 154. A first inlet passage 176 and a second inlet passage 178 are formed through a floor 180 of the chamber 158 and oriented in the direction of the axis of the first section 154 of the valve head 60.

The body 148 of the valve head 60 is also formed with a small cylindrical chamber 182 in the second end 152 thereof and is aligned axially with the axis of the second section 156 of the body. As shown in FIG. 9, a first linking passage 184 is formed in the second section 156 of the body 148 and communicates with the second inlet passage 178 so that the small cylindrical chamber 182 communicates with the large cylindrical chamber 158. A filtered-water stem 186 extends coaxially from, and outboard of, the small chamber 182 and is formed with a second linking passage 188 which communicates with the first inlet passage 176, and thereby with the large chamber 158. An end portion of the stem 186, which extends outward beyond the end 152 of the body 148, is formed with an annular groove 190 around the outer surface thereof. A peripheral surface 192 of the body 148, adjacent the end 152, is formed with a reduced diameter and with fine left-hand threads 194 which extend inboard from the end 152 for a prescribed distance. It is noted that the fine left-hand threads 194 of the valve head 60 and the fine left-hand threads 144 of the nut 58 are matching threads. It is further noted that the left-hand threads 144 and 194 are considered as a second type of fastening structure, the right-hand threads 122 and 142 being a first type of fastening structure as noted above.

In one embodiment of the cylindrical chamber 158 as shown in FIG. 8, the surface area of the chamber which is contiguous with the outlet passages 166 and 168 is formed as a flat surface 196. In another embodiment of the cylindrical chamber 158 as shown in FIG. 4, which is the preferred embodiment, the chamber 158 is fully cylindrical in the area of the passages 166 and 168, and the juncture of the outlet passages with the wall of the chamber are formed with bevelled seats 198 and 200, respectively.

Referring to FIG. 4, the aerator 64 is formed in a cylindrical shape with threads 202 being formed on the outer surface at the upper sides thereof. The threads 202 match the threads of the opening 170 and facilitate the attachment of the aerator 64 to the underbody 174 whereby a flow passage through the aerator is in communication with the chamber 158. The aerator 64 is of the type which is available from Neoperl, Inc. of Waterbury, Conn. as Part Number 300-822.

The nozzle 66 is formed with an axial flow passage 204 and threads 206 on the exterior surface adjacent one end thereof. The threads 206 match the threads of the opening 172 and facilitate the attachment of the nozzle 66 to the underbody 174 whereby the flow passage 204 is in communication with the chamber 158. An O-ring 208 is located between a seat of the opening 172 and the nozzle 66.

Referring to FIGS. 4 and 10 through 14, a spool valve 210 having an axis 211 is formed as a single-piece integral unit from a plastic material such as, for example, Delrin 500P which is a Dupont product. Other suitable plastics could be used without departing from the spirit and scope of the invention. The spool valve 210 is formed with a disc 212 at one end thereof and a knob mount 214 at the other end thereof. A first support fin 216 extends from an inboard surface 218 of the disc 212 toward the knob mount 214 and is joined with a first axial end 220 of a cylindrical cup 222 and extends partially into a bore 224 of the cup from the first axial end thereof. The cup 222 is formed with openings 226 and 228 on each side of the fin 216 which facilitate communication between the exterior environment of the cup and the bore 224 thereof. A second axial end 230 of the cup 222, which is axially opposite the first axial end 220 thereof, is fully open to the bore 224 of the cup.

The disc 212 is formed with a first passage 234 and a second passage 236 spaced from the first passage, each of which extend through the disc from an outboard surface 238 thereof to the inboard surface 218. The first passage 234 is located in the plane of the fin 216 and the fin is formed with an opening 240 which is in communication with the first passage.

A second fin 242 extends from the cup 222 toward the knob mount 214 and straddles a first end 244 of a second cylindrical cup 246 and is formed with a flat bearing surface 247 extending radially from the axis of the spool valve 210. The bearing surface 247 is facing in the direction of the knob mount 214 and is located in a common plane which is perpendicular to the axis of the spool valve 210. The second cup 246 is formed with a bore 248 axially through the cup and the fin 242 extends partially into the bore from the first end 244. A second axial end 250 of the cup 246, axially opposite the first axial end 244, is fully open, while the first axial end 244 is formed with two openings 252 and 254 on each side of the fin 242.

A pair of posts 256 and 258 are located adjacent the side of the cup 246 which is closest to the knob mount 214 and extend radially from the axis 211, and from opposite sides, of the spool valve 210. The posts 256 and 258 are formed with flat bearing surfaces 260 and 262, respectively, which also face in the direction of the knob mount 214 and which are located in the common plane. The side of the cup 246 which faces in the direction of the knob mount 214 is also formed with a flat bearing surface 264 which is located in the common plane and which extends radially from the axis 211.

It is noted that the four bearing surfaces 247, 260, 262 and 264 are located in the common plane, which is perpendicular to the axis 211, and combine to form a common bearing surface.

The spool valve 210 is further formed with a circular hub 266 which extends axially between the common bearing surface and the knob mount 214. The circular hub 266 is formed with an annular groove 268 adjacent the common bearing surface. The hub 266 is also formed with a closed-bottom hole 270, having an open end 272, which extends radially from the axis 211.

The knob mount 214 is formed with a generally flat surface 274 and a half-round body 276 and extends axially away from the hub 266.

Referring now to FIGS. 4, 15, 16 and 17, an end sleeve 278 is formed generally with a cylindrical body 280 and an end flange 282. The body 280 and the flange 282 is formed with a central bore 284, which is open at opposite axial ends 286 and 288 of the sleeve 278. A pair of arcuate, axially-directed grooves 290 and 292 are formed in the wall of the bore 284 and are angularly spaced by ninety degrees. The grooves 290 and 292 extend from the axial end 286 toward the opposite axial end 288. An arcuate extension section 294, which is formed with and extends axially from the axial end 286, is formed with spaced stop surfaces 296 and 298 at opposite ends of the extension section. A locating tab 300 extends axially from the end 288 of the sleeve 278 and is formed with an arcuate upper surface 302 and an arcuate undersurface 304. The tab 300 is aligned, in an axial direction, with the groove 290. An annular groove 306 is formed in the periphery of the flange 282. Eight ribs 305 are formed on an inboard side of the flange 282, with each rib being formed with a rearward facing flat surface 307 located in a common plane which is perpendicular to the axis of the end sleeve 278. The eight flat surfaces 307 combine to provide a common end sleeve bearing surface.

Figure 18:
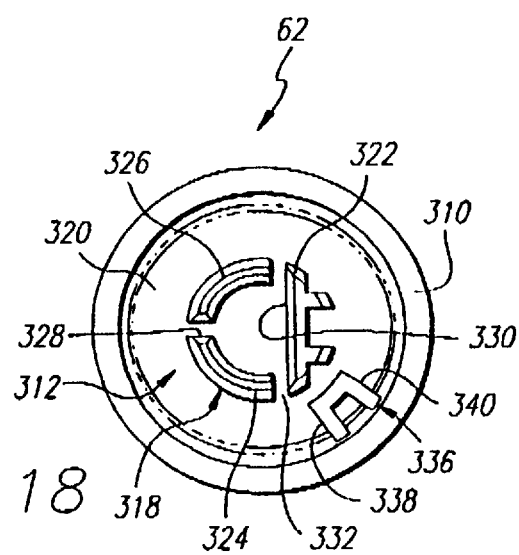
FIG. 18 is an end view showing a knob of the spout valve assembly of FIG. 4 in accordance with certain principles of the invention.

As shown in FIGS. 4 and 18, the knob 62 is formed with a cup-shaped body 308 having a cylindrically-shaped side wall 310 integrally formed with forward circular wall 312 having an outer face 314. The side wall 310 is formed with a series of spaced, axially-directed grooves. The outer face 314 of the wall 312 is formed with a single groove 316 extending from the juncture of the outer face with the side wall 310 in a radial direction toward the axis of the knob 62. A knob retainer 318 is formed generally about the axis of the knob 62 on an inner face 320 of the wall 312 and includes a straight tab 322 and two arcuate tabs 324 and 326 all of which are spaced from each other. The arcuate tabs 324 and 326 are arranged to form a half-circle separated by a space 328 at the interfacing ends of the tabs. The straight tab 322 is placed across a concave shape formed by the arranged arcuate tabs 324 and 326 with opposite ends of one flat face 330 of the tab 322 being spaced from respective non-interfacing ends of the tabs 324 and 326 to form spaces 332 and 334. A limit tab 336 is formed on the inner surface of the side wall 310 and extends radially inward. The tab 336 is formed with a first limit surface 338 and a second limit surface 340.

Prior to assembling the various components of the spout assembly 46, the filter cartridge 126 is essentially filled with a filter media. The filter media could primarily include, for example, granular activated carbon (GAC) which is useful for filtering the undesirable elements in the unfiltered water which are associated with chlorine, taste and odor. Other known water filtering media could be added to the GAC for effectively reducing various metals and minimizing any bacteria which may be in the water to be filtered. Also, ion exchange resins could be added to treat the water being filtered for color and taste. A pre-filter porous mesh could be used within the cartridge 126 adjacent the cover 134 to preclude sediment and suspended particulate from interfering with the filtering action. Further, a post-filter porous material such as, for example, foam could be inserted into the cartridge 126 above the filter media to retain the filter media within the cartridge during processing and handling of the cartridge prior to assembly within the spout shell 56, and for the useful life of the filter cartridge 126.

It is noted that the many known types of suitable media could be used within the filter cartridge 126 without departing from the spirit and scope of the invention.

Proceeding with the assembly of the components of the faucet spout assembly 46, the filter cartridge 126 is inserted into the threaded end 123 of the spout shell 56 until the end 130 thereof is located with the cover 134 adjacent the portal 120 formed through the wall of the hub 44. As the cartridge 126 is inserted into the spout shell 56, the tabs 135 at the first axial end 130 of the cartridge centrally locate the first axial end within the spout shell.

Figure 5:
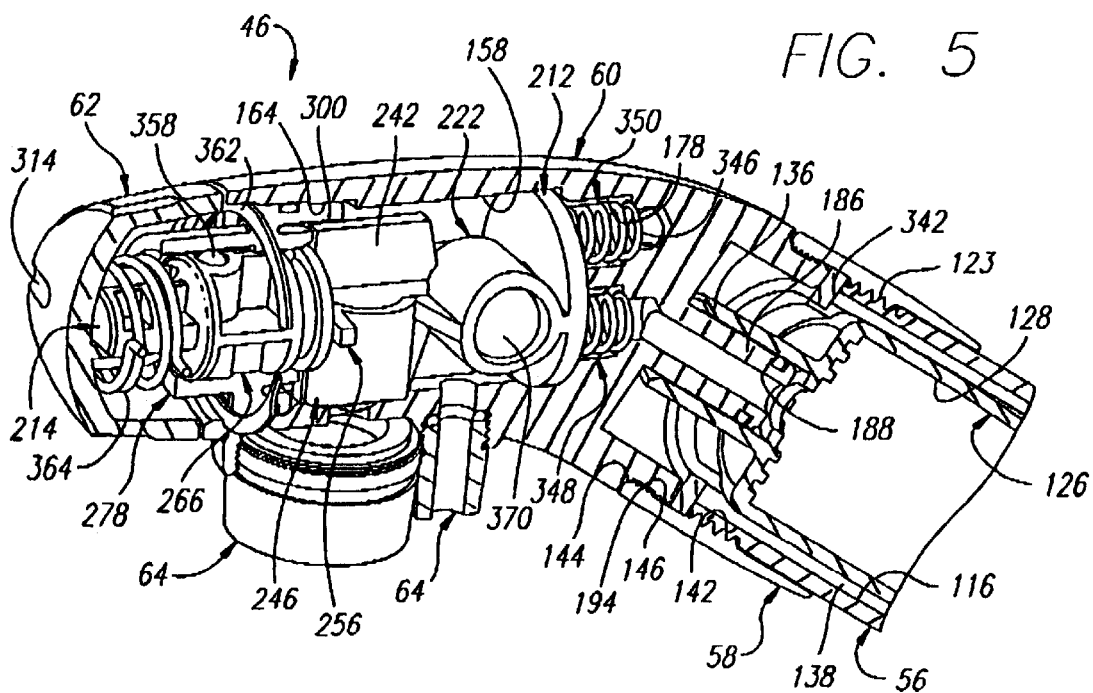
FIG. 5 is a perspective sectional view showing the assembled first embodiment of the spout valve assembly of FIG. 4 in accordance with certain principles of the invention, and the filter cartridge of FIG. 4 mounted in the spout in accordance with certain principles of the invention.

Referring to FIGS. 4 and 5, the aerator 64 is assembled with the valve head 60 by threadedly inserting the threads 202 of the aerator into the first threaded opening 170. The O-ring 208 is inserted into the second threaded opening 172 and the nozzle 66 is thereafter threadedly assembled within the opening.

A pair of coil springs 344 and 346 are placed within a pair of cup-shaped rubber seals 348 and 350, respectively. Each of the rubber seals 348 and 350 is formed with a cylindrical side wall 347 which is fully open at one axial end 349 and formed with a base or floor 351 at the opposite axial end, with a small axial opening 353 in the base thereof. The end of the spring 344, which extends from the open end of the seal 348, is placed in the first inlet passage 176 of the valve head 60, and the end of the spring 346, which extends from the open end of the seal 350, is placed in the second inlet passage 178 of the valve head. In this position, the base 351 of each of the seals 348 and 350 is located in the chamber 158 of the valve head 58 extending into the chamber from the inlet passages 176 and 178, respectively.

Figure 15:
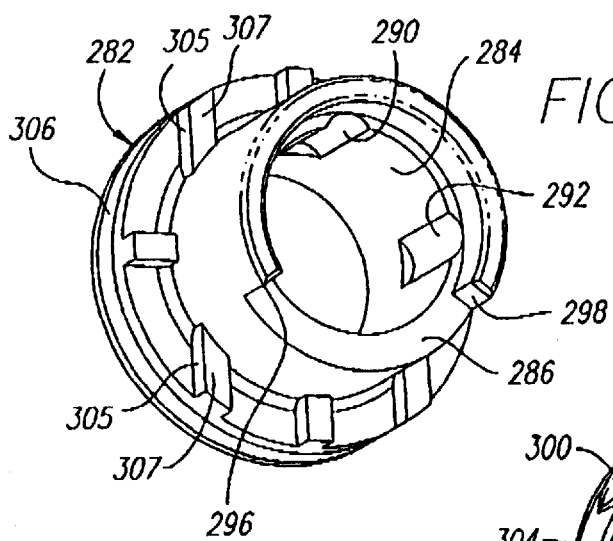
FIG. 15 is a perspective view showing a first axial end of an end sleeve of the spout valve assembly of FIG. 4 in accordance with certain principles of the invention.
Figure 16:
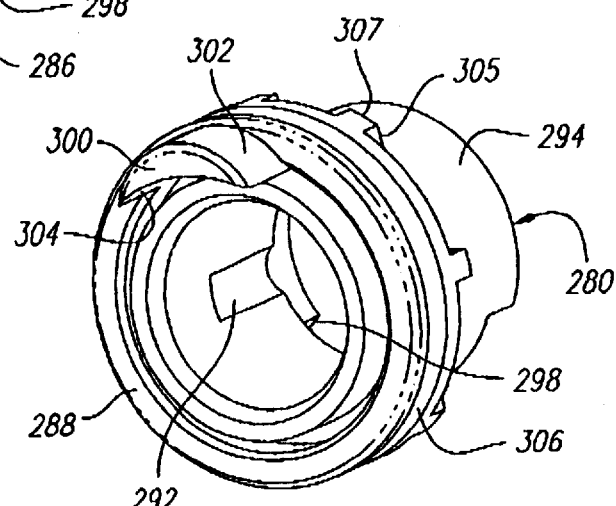
FIG. 16 is a perspective view showing a second axial end of the end sleeve of FIG. 15 in accordance with certain principles of the invention.
Figure 17:
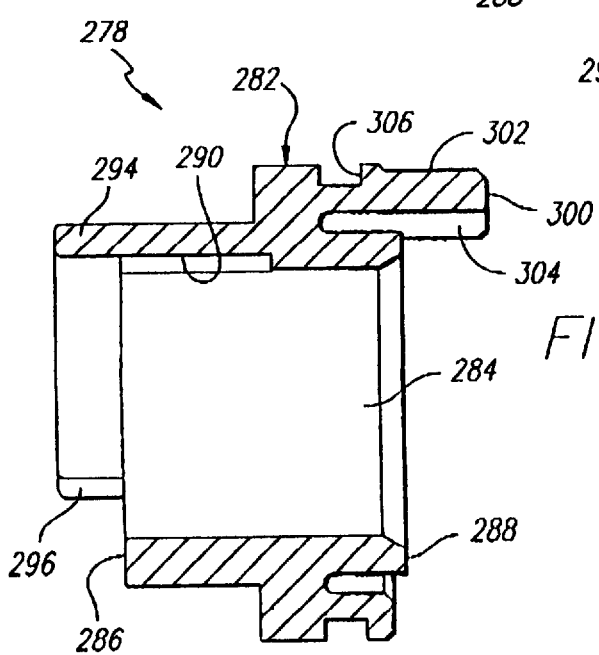
FIG. 17 is a sectional view showing the end sleeve of FIG. 15 in accordance with certain principles of the invention.

Thereafter, an O-ring 352 (FIG. 4) is positioned in the annular groove 268 of the spool valve 210, and a detent coil spring 354 and a pair of stainless steel detent balls 356 and 358 are placed in the hole 270 in the order illustrated in FIGS. 4 and 20. An O-ring 360 is placed in the annular groove 306 formed in the flange 282 of the end sleeve 278. The end sleeve 278 is then positioned so that the axes of the sleeve and the spool valve 210 are aligned as shown in FIG. 4, the steel ball 358 of the spool valve is aligned with the groove 290 of the end sleeve and the stop surfaces 296 and 298 are equally spaced about an imaginary vertical line with respect to the position of the stop surfaces as illustrated in FIG. 15. The end sleeve 278 is then slipped over the hub 266 of the spool valve 210 where the ball 358 glides into, and moves generally to the longitudinal middle of, the groove 290. The forward axial end 288 of the end sleeve 278 is moved into engagement with the common bearing surface formed by the flat surfaces 247, 260, 262 and 264. A first rubber ball 370 is inserted into the bore 224 of the spool-valve cup 222 at the second axial end 230 thereof, and a second rubber ball 372 is inserted into the bore 248 of spool-valve cup 246 at the second axial end 250 thereof. The assembled spool valve 210 and end sleeve 278 form a valve/sleeve subassembly which is now ready for assembly within the chamber 158 of the valve head 60.

With the disc 212 of the spool valve 210 facing the opening 160 of the valve head 60, and with the arcuate locating tab 300 of the end sleeve 278 being aligned with the arcuate slot 164 of the valve head 60, the valve/sleeve subassembly is moved such that the disc is inserted into the chamber 158 and the arcuate tab begins to enter the arcuate slot. Upon continued movement of the valve/sleeve subassembly axially further into the chamber 158, the outboard surface 238 of the disc 212 engages the outer surfaces of the bases 351 of the seals 348 and 350. In this mode of operation, the small opening 353 of the seal 348 facilitates communication between the first inlet passage 176 of the valve head 60 and the first passage 234 of the spool valve 210. When the spool valve 210 is turned to the other mode of operation, the opening 353 of the seal 350 facilitates communication between the second inlet passage 178 of the head 60 and the second passage 236 of the spool valve.

A retainer ring 362 is compressed and moved over the knob mount 214 of the spool valve 210 and the outer periphery of the body 280, and firmly against the common bearing surface formed by the flat surfaces 307 of the end sleeve 278. The ring 362 is then relaxed whereby the ring expands radially outward and partially into the annular groove 162 of the valve head 60. In this manner, the valve/sleeve subassembly is retained with the valve head 60, and partially within the chamber 158, as shown in FIG. 5, with the knob mount 214 extending rearward from the sleeve 278 which, in turn, is extending partially from the head.

Thereafter, a collar spring 364 is radially expanded by squeezing together opposite ends 366 and 368 thereof and the spring is positioned over the knob retainer 318 formed by the two spaced arcuate tabs 324 and 326, and the spaced straight tab 322. The spring 364 is then released whereby the coils of the spring collapse around the knob retainer 318. As a result of the collapsing of the spring 364, the tabs 322, 324 and 326 are urged closer together under the biasing action of the spring. The knob 62 is then manipulated to position the biased tabs 322, 324 and 326 onto the knob mount 214 of the spool valve 210 whereby the knob is retained with the assembly of the head 60, the valve and the sleeve 278. Due to the essentially half-round shape of the knob mount 214, and the complementary biased configuration of the knob retainer 318, the knob 62 can only be positioned onto the mount in one orientation. In this orientation, the groove 316 on the outer face 314 of the knob 62 will be located in a horizontal direction to the left as viewed in FIGS. 5, 19 and 20. The horizontal direction of the groove 316 represents that the spool valve 210 is in the position illustrated in FIGS. 5, 19 and 20 facilitating the dispensing of filtered water through the faucet spout assembly 46. Also, the stop surface 298 of the end sleeve 278 is located in engagement with the second limit surface 340 of the knob 62 which locates the knob, and the groove 316, when the faucet spout assembly is in the filtered water dispensing mode.

Thereafter, an O-ring 368 is positioned in the groove 190 of the filtered-water stem 186 which extends from the valve head 60. The left-hand threads 194 of the valve head 60 are placed in mesh with the left-hand threads 144 of the nut 58 and the head is threaded into attachment with the nut by relative rotation between the head and the nut. Eventually, the threads 194 move axially beyond the threads 144 and the threads 194 are now located out of threaded engagement with the threads 144 and are located in the unthreaded section 146.

Thereafter, as illustrated in FIG. 5, a flat rubber washer 342 is inserted into the open, unthreaded end 149 of the nut 58 and located on the second end 162 of the valve head 60 at the juncture of the coarse threads 142 and the unthreaded section 146. The nut 58 is then threadedly connected to the top of the spout shell 56 through the right-hand coarse threads 122 and 142 of the shell and nut, respectively. As the nut 58 and the spout shell 56 are drawn tightly together by the threaded assembly thereof, the washer 342 is compressed between the spout shell end 123 and the valve head end 152.

It is noted that the head 60 can be swiveled relative to the nut 58 and the spout shell 56 due to the location of the left hand threads 194 of the head being located adjacent the first unthreaded section 146. At the same time, the spout shell 56 is secured to the nut 58 by virtue of the mesh engagement of the right hand threads 122 of the spout shell and the right hand threads 142 of the nut. It is also noted that the left hand threads 144 and 194 represent a first type of fastening structure, and the right hand threads 122 and 142 represent a second type of a fastening structure.

This completes the assembly of the components of the faucet spout assembly 46.

In use of the faucet spout assembly 46, the handle 50 of the faucet 40, as shown in FIGS. 1 and 2, is manipulated to control, in a conventional manner, the volume and temperature of water to be dispensed from the faucet. This is accomplished by selective positioning of the movable plate 96 (FIG. 3) with respect to the fixed plate 94 of the cartridge valve 82. Referring to FIG. 3, the water, which is unfiltered at this location, passes from the cartridge valve 46, through the outlet passage 76 and the portal 120, and eventually into the spout shell 56.

Referring to FIG. 4, the unfiltered water entering the spout shell 56 through the portal 120 can flow into and through the filter cartridge 126, and/or into and through the space 38 (FIG. 5) between the exterior of the filter cartridge and the interior wall of the spout shell 56 as determined by the position of the knob 62. Referring to FIGS. 19 and 20, an operator of the faucet 40 has selectively positioned the knob 62 so that the groove 316 is in the horizontal position and the spool valve 210 is in the position to dispense filtered water that has passed through the filter cartridge 126.

When the knob groove 316 is in the vertical position, whereby the spool valve 210 is positioned to dispense unfiltered water, the steel ball 358 is biasingly urged into the groove 290 of the end sleeve 278 and the stop surface 298 of the sleeve is abutting the limit surface 340 of the knob 62. When the operator wishes to operate the faucet 40, and the faucet spout assembly 46, in the filtered-water-dispensing mode, the operator turns the knob 62 in a counterclockwise direction whereby the groove 316 moves to the horizontal position shown in FIGS. 5, 19 and 20. During rotation of the knob 62, the limit tab 336 of the knob moves to position the first limit surface 338 into abutting engagement with the stop surface 298 of the sleeve 278, which occurs when the knob groove 316 is in the horizontal position. Also, during rotation of the knob 62, the steel ball 358 is urged laterally out of the slot 290 of the sleeve 278 and eventually into the slot 292 of the sleeve. This action provides a tactile response to the operator regarding the desired locating of the spool valve 210 for the selected dispensing mode.

Referring to FIGS. 19 and 20, when the spool valve 210 is selectively placed in the filtered-water-dispensing mode as described above, the cup 246 of the valve is positioned in a vertical orientation with the second axial end 250 surrounding the valve opening 166. With the cup 246 in the vertical position, the rubber ball 372 is sealingly seated on the bevelled seat 200 to prevent the flow of water through the first outlet passage 166 of the valve head 60 and the aerator 64. In addition, the valve cup 222 is in a horizontal position whereby the second outlet passage 168 of the valve head 60 is open to allow the passage of filtered water to pass through the second outlet passage and the nozzle 66.

As indicated by the arrows, water is passing through the filter cartridge 126 and is being filtered therein. The filtered water exits from the cartridge 126 and travels through the passage 188 of the valve head stem 186, through the first valve head inlet passage 176, the small opening 353 of the rubber seal 348, through the first passage 234 formed in the spool valve disc 212, and into the valve head chamber 158 adjacent the exterior of the cup 222. In this context, the chamber 158 functions as a fluid-containing plenum. The filtered water fills the space of the chamber 158 and the cups 222 and 246. Since the cup 246 is vertically oriented, and the ball 370 is seated on the bevelled seat 198 of the valve head 60, the vertically downward pressure and force on the ball, from the water which flows into the cup 246, further enhances the sealing effect of the ball and the seat to preclude any filtered water from being dispensed through the aerator 64. Instead, with the second outlet passage of the valve head 60 being open, the filtered water will be dispensed from the chamber 158, and through the flow passage of the nozzle 66.

Figure 21:
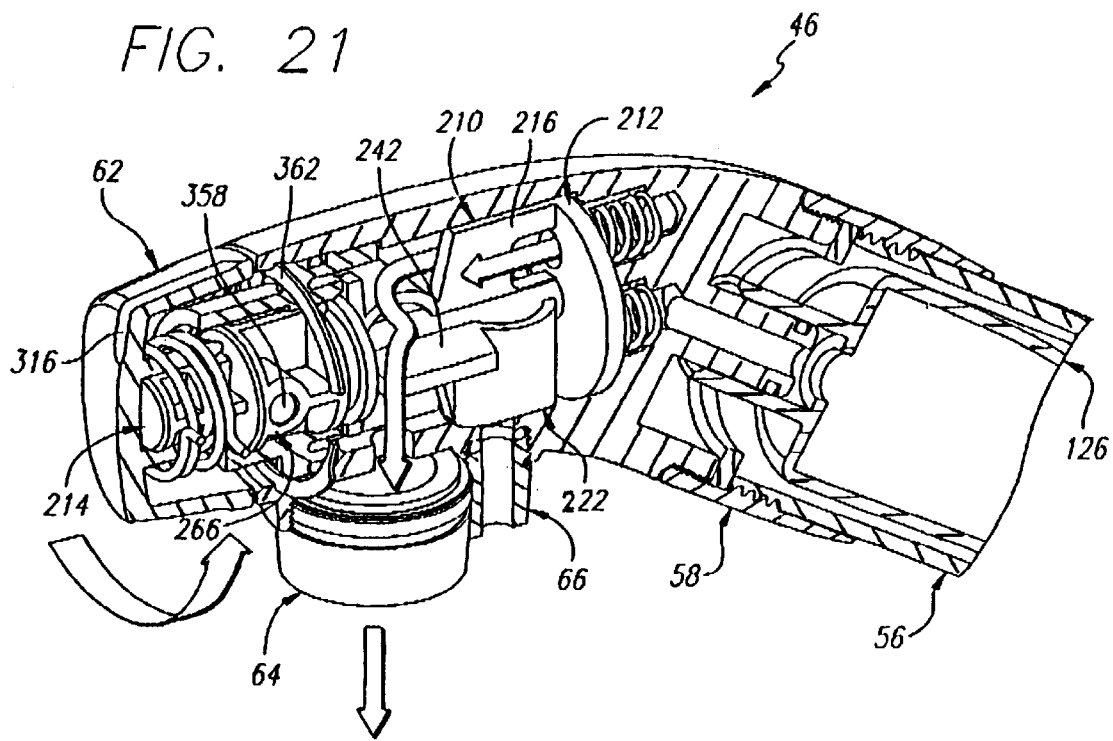
FIG. 21 is a perspective sectional view showing the path of unfiltered water through the assembled spout valve assembly of FIG. 4 in accordance with certain principles of the invention.
Figure 22:
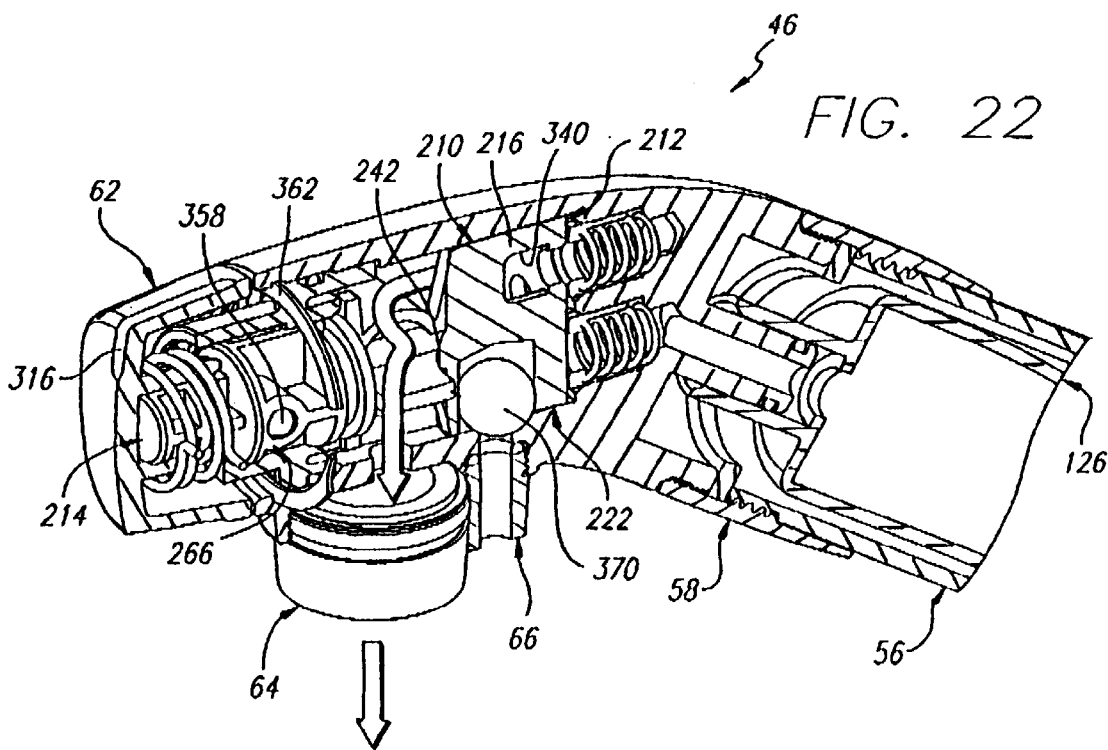
FIG. 22 is a perspective sectional view with parts broken away showing the path of unfiltered water through the assembled spout valve assembly of FIG. 4 in accordance with certain principles of the invention.
Figure 27:
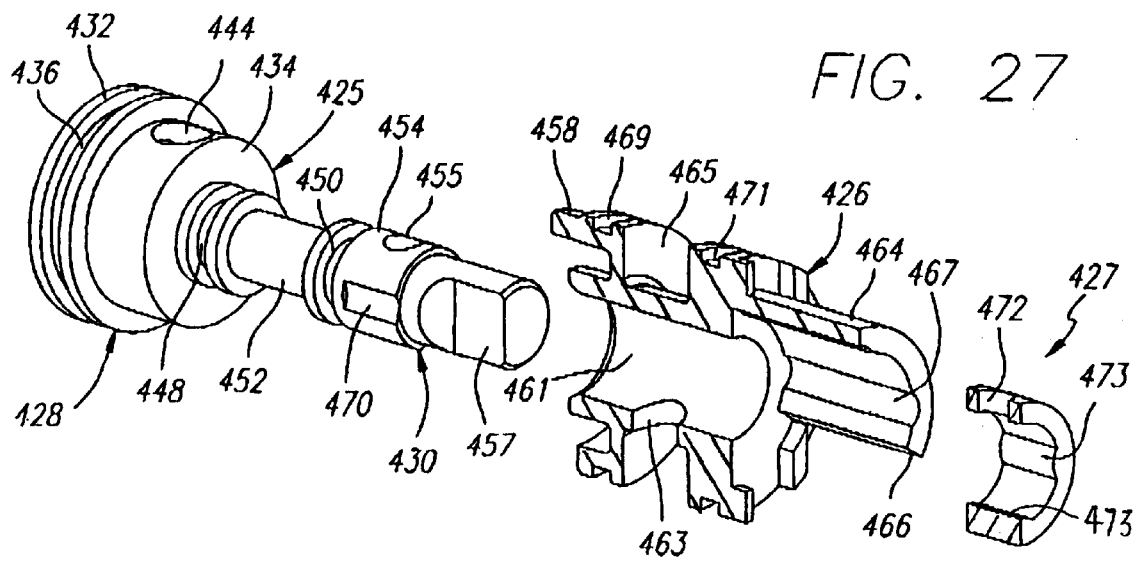
FIG. 27 is an exploded perspective view showing a third embodiment of a spout valve assembly in accordance with certain principles of the invention.
Figure 28:
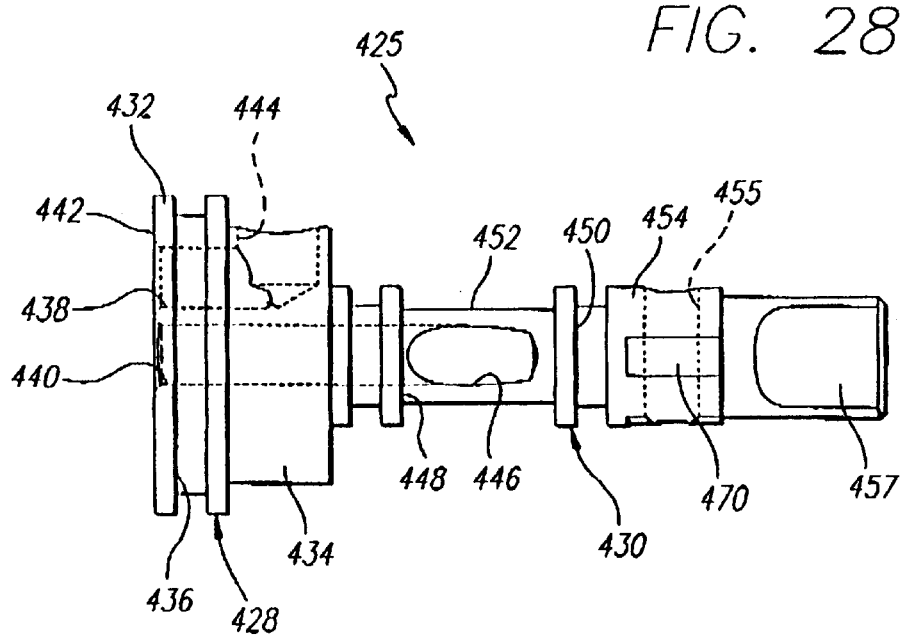
FIG. 28 is a side view showing a valve spool of the spout valve assembly of FIG. 27 in accordance with certain principles of the invention.
Figure 29:
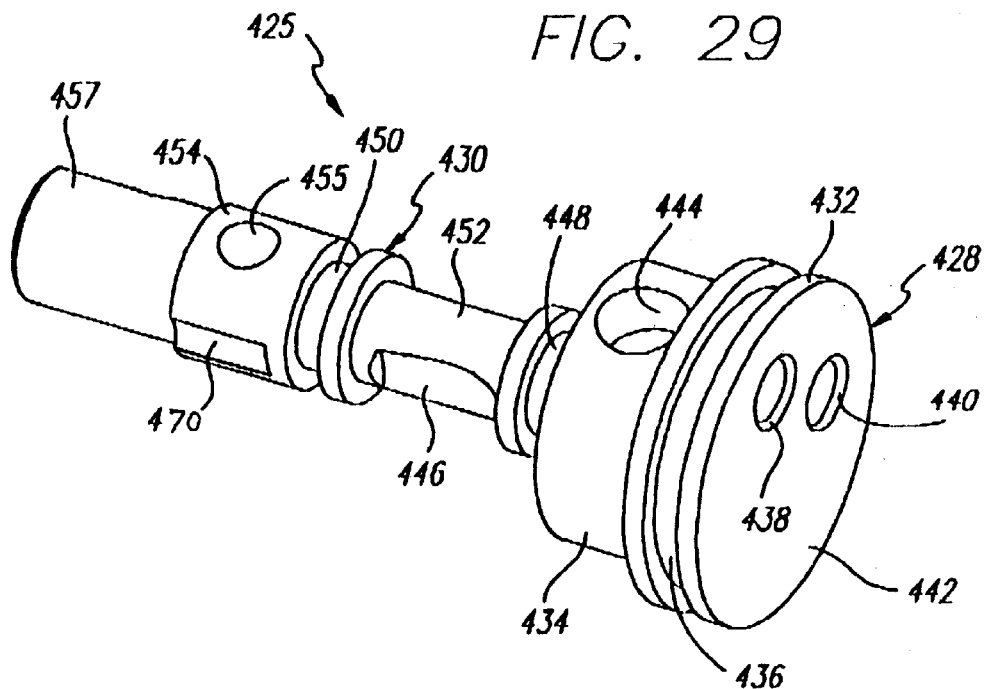
FIG. 29 is a perspective view showing the valve spool of FIG. 28 in accordance with certain principles of the invention.

When the operator desires to select the dispensing of the unfiltered water, the knob 62 is turned in a clockwise direction, as indicated by the arrow in FIG. 20, to move the groove 316 to the vertically upward orientation, as illustrated in FIGS. 21 and 22. In this mode, the cup 222 is now in a vertical orientation and the cup 246 is in a horizontal orientation. The ball 370 is now seated on the bevelled seat 200 to preclude the flow of water from the chamber 158 and through the passage 204 of the nozzle 66. The unfiltered water travels within the spout shell 56 and outside of the filter cartridge 126 as noted above. The unfiltered water enters the small chamber 182 of the valve head 60 and flows through the first linking passage 184 of the head. The unfiltered water continues to flow through the second inlet passage 178, the small opening 353 of the seal 350, the disc opening 236 and into the chamber 158 through the opening 240 in the fin 216. The unfiltered water fills the chamber 158 and the cups 222 and 246 whereby the water is dispensed through the aerator 64. In addition, the water flowing into the cup 222 enhances the seal formed by the ball 370 which is seated on the bevelled seat 200 to preclude the flow of unfiltered water through the nozzle 66.

Figure 10:
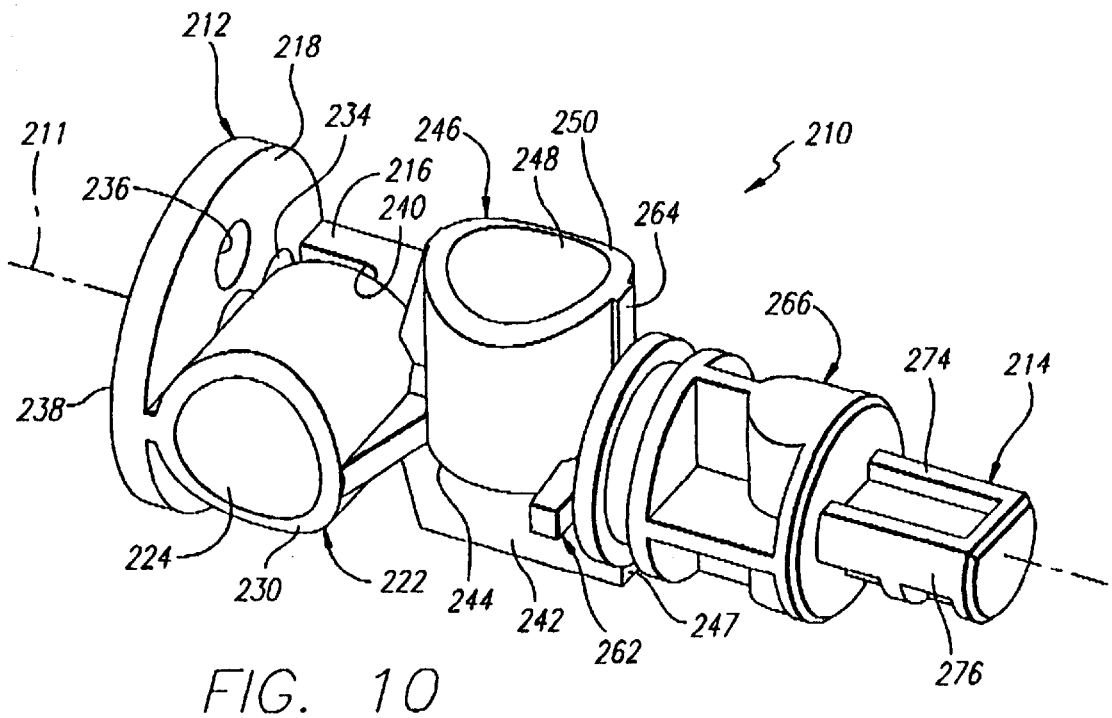
FIG. 10 is a perspective view showing a valve spool of the spout valve assembly of FIG. 4 in accordance with certain principles of the invention.
Figure 11:
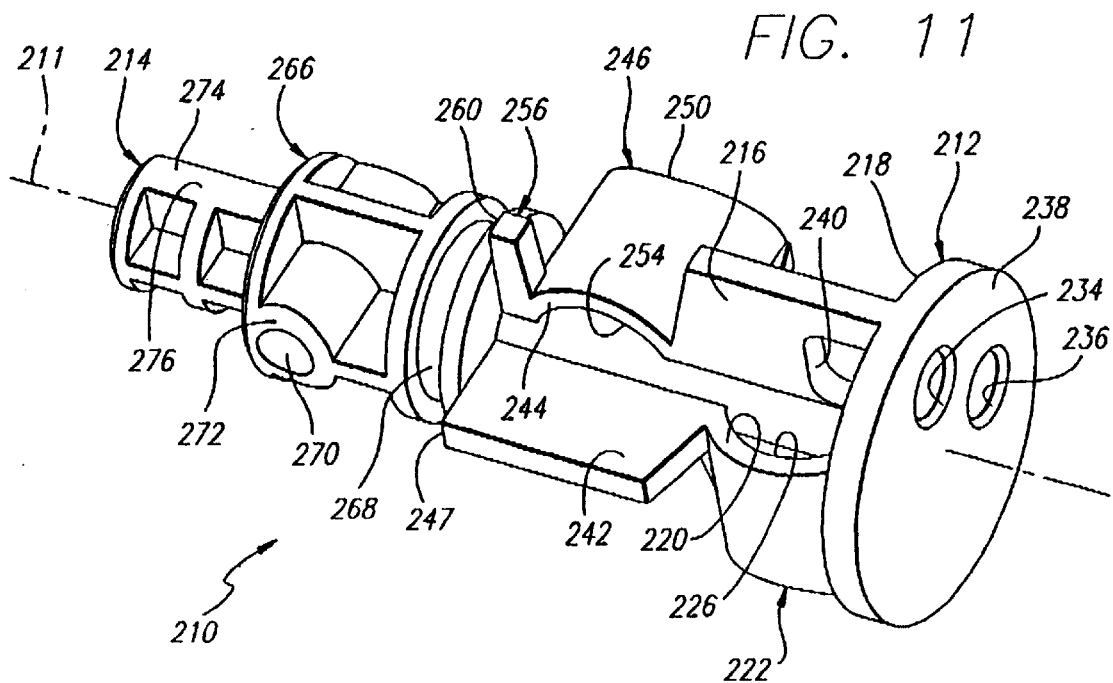
FIG. 11 is a perspective view showing the valve spool of FIG. 10 in accordance with certain principles of the invention.

Referring to FIGS. 10 and 11, the first and second passages 234 and 236 of the spool valve disc 212 are spaced apart sufficiently so that the seals 348 and 350 preclude the flow of the unfiltered water into the chamber 158 when operating in the filtered-water mode and vice-versa. However, if the handle 50 (FIG. 1) has been positioned so that filtered or unfiltered water is being dispensed, and the operator chooses to switch from one mode to the other, the passages 234 and 236 are spaced sufficiently close to each other to allow water to flow through each of the passages during a transition period when shifting when the mode-shifting action is occurring. This precludes a pressure build-up within the faucet 40, including the faucet spout assembly 46, during the transition period which might otherwise have caused damage to components thereof.

If the operator desires to change the filter cartridge 126, the nut 58 is rotated in a direction to provide interaction between the right-hand coarse threads 122 of the spout shell 56 and the right-hand coarse threads 142 of the nut to facilitate separation of the nut from the spout shell. During the period when the nut 58 is being rotated, the left-hand threads 144 are also being rotated. However, the left-hand threads 194 of the valve head 60 are located in the unthreaded section 146 of the nut and are not meshed with the left-hand threads 144. Further, the threads 144 and 194 are left-hand threads which will not engage during rotation of the nut 58 to effect separation of the nut from the spout shell 56.

Having described above the preferred embodiment of the invention, the following description will address other embodiments which also provide for the selection of filtered and unfiltered water through a common facility. In some instances, some of the components of the alternate embodiments include components which are common to the preferred embodiment. In those instances, the common components will not be described further except to show how they function with the alternate components.

Referring to FIGS. 23 through 26, a second embodiment of the faucet 40, with a faucet spout assembly, includes a large spool valve 374 which is formed in a generally cylindrical shape with three space annular grooves 376, 378 and 380, and two sections 382 and 384 therebetween as illustrated. A cylindrical hub 386 extends axially from and is adjacent to the groove 376. The hub 386 is formed with a closed end opening 388 which receives a biasing spring 390 and two steel balls 392 and 394. A knob mount 396 extends axially from the hub 386 and is aligned for assembly with the knob 62. As shown in FIGS. 24 and 25, an end face 396 of the valve 374 is formed with a pair of valve inlet openings 398 and 400 which communicate with valve outlet openings 402 and 404 formed in sections 382 and 384, respectively. A first valve passage 399 provides fluid communication between the openings 398 and 402, and a second valve passage 401 provides fluid communication between the openings 400 and 404.

Three O-rings 406, 408 and 410 are placed in the grooves 376, 378 and 380, respectively and a large washer 412 is placed against a rear face 414 of the valve 374 adjacent the groove 376. After the valve 374 is placed in the chamber 158 of the head 60, a retainer ring 416 is compressed and placed within an annular groove 418 formed inside the head adjacent the end 150 thereof. In this manner, the valve 374 is retained within the chamber 158 of the head 60.

The end sleeve 278, which is shown in FIG. 23, is not formed with the arcuate tab 300 but is formed with a pair of axially-directed, laterally extending ribs (not shown). The ribs of the sleeve 278 are located within a pair of complementary grooves 417 (one shown) formed just inside of the chamber 158 at the end 150 of the head 60 when the sleeve is positioned on the hub 386 and against the retainer ring 416. The ribs of the sleeve 278 and the grooves 417 of the head 60 perform the same function as the arcuate tab 300 and the arcuate slot 164 as described above, that is, to attach the sleeve with the head so that the sleeve does not turn or follow the valve 374 when the valve is moved from one mode to the other.

A tensioning facility 420, such as, for example, a rolled metal sheet formed in a radially inward biasing configuration, is placed tightly around the knob retainer 318 to bias the retainer, in the manner described above with respect to collar spring 364, whereafter the knob 62 is assembled on the knob mount 396.

The nut 58 is formed with the fine left-hand threads 144, the coarse right-hand thread 142 and the unthreaded section 146 in the same manner as illustrated in FIG. 4. The head 60 is formed with an annular groove 422 for receipt of an O-ring 424.

Referring to FIG. 26, the knob 62 has been positioned so that unfiltered water will flow into valve opening 398, through valve passage 399, through valve opening 402, into a sub-chamber formed by O-rings 378 and 380, section 382 and thereafter is dispensed through the aerator 64. By adjustment of the knob 62, the valve 374 is placed in the filtered-water mode whereby the valve is positioned to facilitate flow of the filtered water through the valve and the dispensing thereof through the nozzle 66.

Referring to FIGS. 27, 28, 29 and 30, a third embodiment of the faucet 40, with a faucet spout assembly, includes a spool valve 425, an end sleeve 426 and a retainer ring or bushing 427. The ultimate assembly of the valve 425, the end sleeve 426 and the ring 427 is to be inserted into a valve head of the type illustrated as the valve head 60 in FIGS. 4, 7, 8 and 9.

The valve 425 is formed with a large cylindrical head section 428 and a smaller stem section 430. The head section 428 is formed with a disc 432 and a reduced hub 434. The disc 432 is formed with an annular groove 436 in the periphery thereof, and a pair of openings 438 and 440 in a forward face 442 and through the disc. The opening 438 communicates with an opening 444 formed in the hub 434 and the opening 440 communicates with an elongated opening 446 formed in the stem section 430. The stem section 430 is formed with two annular grooves 448 and 450 which define a section 452 of the valve 425 including the elongated opening 446. An enlarged hub 454 of the stem section 430 is formed with an opening 455 for receipt of a spring and a pair of steel balls (not shown) for the same purpose described above, and a knob mount 457 is formed with and extends axially outward from the hub 454 for mounting the knob 62 (FIG. 4) thereon. O-rings are placed in the grooves 436, 448 and 450.

Figure 30:
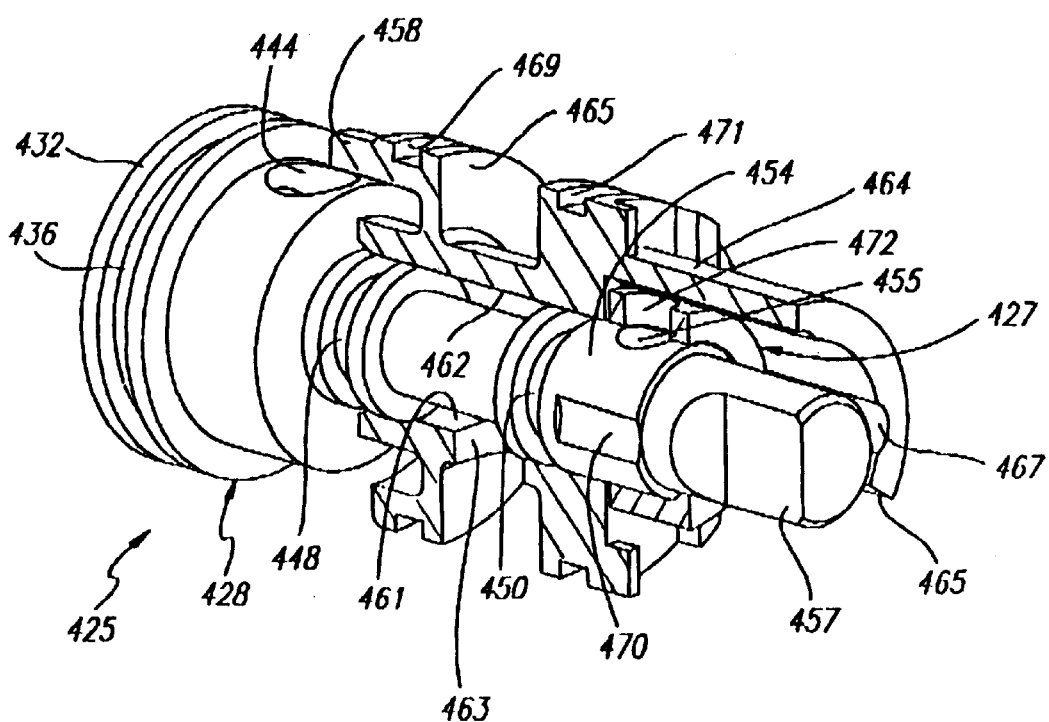
FIG. 30 is a perspective view showing the valve spool of FIG. 28 in assembly with a sleeve and bushing of the spout valve assembly of FIG. 27 in accordance with certain principles of the invention.

The end sleeve 426 is positionable over a portion of the valve 425, as shown in FIG. 30, and is formed with an extended tab 458 which is similar to the locating tab 300 (FIG. 16) for orienting the sleeve when assembled over the stem section 430 and for proper ultimate assembly with the valve head. The end sleeve 426 is formed with an internal wall 461 which covers the section 452 to form a sub-chamber 462. The wall 461 is formed with an opening 463 which communicates with an exterior section 465 of the sleeve 426. A cylindrical body 464 extends axially to the rear of the end sleeve 426 and is formed with two spaced stop surfaces 466 (one shown) which function in the same manner as stop surfaces 296 and 298 as described above. Also, the interior wall of the body 464 is formed with two spaced, axially-directed grooves 467 (one shown) which function in the same manner as the grooves 290 and 292 as described above. O-rings (not shown) are placed in a pair of peripheral grooves 469 and 471.

The retainer ring or bushing 427 is formed with three curved ribs 473 (one shown, one partially shown) on bottom and opposite sides of the inner wall thereof which are located to slide into complementary grooves 470 (two shown) formed on the bottom and opposite sides of the exterior of the hub 454. The ring 427 is formed with a hole 472 therethrough which allows the outer most steel ball to extend from the opening 455 and partially through the hole selectively to engage either of the two spaced axially-directed grooves 467 (one shown) formed in the inner wall of the body 464 of the end sleeve 426 at locations spaced angularly by ninety degrees. This arrangement provides the tactile response noted above with respect to the spring 354 and the steel balls 356 and 358.

When the subassembly of the valve 425, the end sleeve 426 and the ring 427 is placed into the chamber of the valve head, the O-ring in the valve groove 436 and the O-ring in the sleeve groove 469 combine with the O-ring in the valve groove 450 to provide a sealed sub-chamber into which filtered water can flow from the hub opening 444. The filtered water will then be dispensed through a nozzle (not shown) which is similar to the nozzle 66.

When the valve 425 is positioned in the unfiltered-water mode, the valve opening 446 is in communication with the sub-chamber 462. Unfiltered water will now flow into the chamber 462, through opening 463, into a sub-chamber formed by the section 462 and the interior wall of the valve head, and is dispensed through an aerator of the same type as the aerator 64 (FIG. 4).

As noted above, the valve 425 and the sleeve 426 are assembled within the head 60 in a manner similar to the assembly of the preferred embodiment. The sleeve 426 is keyed to the valve head 60 and does not rotate relative to the head. The ring 427 is keyed to and rotates with the spool valve 425, and facilitates retention of the steel balls and the spring within the opening 455.

In each of the above-described embodiments, the faucet spout assembly 46 provides for the processing of filtered or unfiltered water through a common facility by selecting one of two modes of operation of the assembly. Provisions are made for precluding the flow of unfiltered water into the common chamber 158 during the filtered-water mode, and vice-versa. Tactile response and travel limit facilities assist in the successful switching from one mode to another, which can be accomplished efficiently and easily during the continuous supply of water, in either mode, to the faucet spout assembly 46. Also, facility is provided for readily changing the filter cartridge 126 with little effort, and without disruption to the faucet spout assembly 46.

The faucet spout assembly 46 is formed with the first and second outlet passages 166 and 168, respectively, for dispensing the unfiltered and filtered water, respectively, therefrom. The outlet passages 166 and 168 could be replaced with a single passage which would selectively dispense the unfiltered or filtered water without departing from the spirit and scope of the invention.

In general, the above-identified embodiments are not to be construed as limiting the breadth of the present invention. Modifications, and other alternative constructions, will be apparent which are within the spirit and scope of the invention as defined in the appended claims.

What is claimed is:

1. A faucet spout assembly, which comprises:

a spout;

a first fluid inlet passage and a second fluid inlet passage located within the spout;

a fluid outlet passage located in the spout, the fluid outlet passage comprising a first outlet passage and a second outlet passage;

the first fluid inlet passage and the fluid outlet passage forming a first fluid flow path within the spout;

the second fluid inlet passage and the fluid outlet passage forming a second fluid flow path within the spout;

a valve mounted on the spout and formed with a valving structure located in direct communication with the first fluid flow path and the second fluid flow path, the valve being formed with structure for providing fluid communication between the first inlet passage and the first outlet passage upon selective positioning of the valve therefor, and for providing fluid communication between the second inlet passage and the second outlet passage upon selective positioning of the valve therefor;

means for selectively positioning the valving structure to obtain open communication within and through (1) the first fluid flow path or (2) the second fluid flow path;

a first sealing member for sealing the first outlet passage when the valve has been positioned to allow fluid to flow through the second inlet passage wherein the first sealing member comprises a cup-like compartment movable with the valve; a freely movable element within the cup-like compartment; and means for positioning the compartment adjacent the first outlet passage thereby to allow the element to move freely within the compartment and into sealing engagement with the first outlet passage;

a second sealing member for sealing the second outlet passage when the valve has been positioned to allow fluid to flow through the first inlet passage; and means for selectively operating the first sealing member or the second sealing member.

2. The faucet spout assembly as set forth in claim 1, wherein the cup-like compartment is formed with an opening which, when the valve is oriented to facilitate fluid communication between the second inlet passage and the second outlet passage, allows fluid to enter the compartment and engage a portion of the movable element in such a manner that a fluid force is applied to the movable element to enhance the sealing engagement of the movable element with the first outlet passage.

3. A faucet spout assembly, which comprises:

a spout;

a first fluid inlet passage and a second fluid inlet passage located within the spout;

a fluid outlet passage located in the spout, the fluid outlet passage comprising a first outlet passage and a second outlet passage;

the first fluid inlet passage and the fluid outlet passage forming a first fluid flow path within the spout;

the second fluid inlet passage and the fluid outlet passage forming a second fluid flow path within the spout;

a valve mounted on the spout and formed with a valving structure located in direct communication with the first fluid flow path and the second fluid flow path, the valve being formed with structure for providing fluid communication between the first inlet passage and the first outlet passage upon selective positioning of the valve therefor, and for providing fluid communication between the second inlet passage and the second outlet passage upon selective positioning of the valve therefor;

means for selectively positioning the valving structure to obtain open communication within and through (1) the first fluid flow path or (2) the second fluid flow path;

a first sealing member for sealing the first outlet passage when the valve has been positioned to allow fluid to flow through the second inlet passage;

a second sealing member for sealing the second outlet passage when the valve has been positioned to allow fluid to flow through the first inlet passage wherein the second sealing member comprises a cup-like compartment movable with the valve; a freely movable element within the cup-like compartment; and means for positioning the compartment adjacent the second outlet passage thereby to allow the element to move freely within the compartment and into sealing engagement with the second outlet passage; and means for selectively operating the first sealing member or the second sealing member.

4. The faucet spout assembly as set forth in claim 3, wherein the cup-like compartment is formed with an opening which, when the valve is oriented to facilitate fluid communication between the first inlet passage and the first outlet passage, allows fluid to enter the compartment and engage a portion of the movable element in such a manner that a fluid force is applied to the movable element to enhance the sealing engagement of the movable element with the second outlet passage.

5. A faucet spout assembly, which comprises:

a spout;

a first fluid inlet passage and a second fluid inlet passage located within the spout;

a fluid outlet passage located in the spout;

the first fluid inlet passage and the fluid outlet passage forming a first fluid flow path within the spout;

the second fluid inlet passage and the fluid outlet passage forming a second fluid flow path within the spout;

a valve mounted on the spout and formed with a valving structure located in direct communication with the first fluid flow path and the second fluid flow path;

means for selectively positioning the valving structure to obtain open communication within and through (1) the first fluid flow path or (2) the second fluid flow path; and detent structure which provides tactile response when the valve is positioned for inlet water flow through either the first inlet passage or the second inlet passage wherein the detent structure comprises an opening formed in the valve; a fixed wall located adjacent the opening of the valve; a pair of spaced depressions formed in the fixed wall adjacent a path of travel of the opening in the valve when the valve is moved for selective positioning; a movable element located within the opening; biasing means for normally urging the movable element in a direction out of the opening; the fixed wall being sufficiently close to the opening to retain the biased movable element within the opening, where a small portion of the element is allowed to move biasingly out of the opening when either of the pair of depressions in the fixed wall is located adjacent the opening.

6. A faucet spout assembly, which comprises:

a spout having a first fastening structure of a first type formed thereon;

a head having a second fastening structure of a second type formed thereon; and a coupler for coupling the spout to the head in such a manner that the head and the spout can be swivelled with respect to each other;

the coupler comprising:
 a third fastening structure of the first type formed thereon for complementary engagement with the first fastening structure;
 a fourth fastening structure of the second type formed thereon for complementary engagement with the second fastening structure;
 a non-fastening-structure section located on the coupler between the third and fourth fastening structures where the first fastening structure of the head may be selectively located; and
 means formed on the third fastening structure for retaining the head with the coupler while the head is being swivelled.

7. The faucet spout assembly as set forth in claim 6, which further comprises means formed on the coupler and the head for preventing separation of the head and the coupler when the coupler is in the process of being separated from the spout.

8. The faucet spout assembly as set forth in claim 6, wherein the fastening structure of the first type are left-hand threads.

9. The faucet spout assembly as set forth in claim 6, wherein the fastening structure of the second type are right-hand threads.

10. The faucet spout assembly as set forth in claim 9, wherein the fastening structure of the first type are left-hand threads.

11. A faucet spout assembly, which comprises:

a spout having a section with left-hand threads formed thereon;

a head having a section with right-hand threads formed thereon; and a coupler for coupling the spout to the head in such a manner that the head and the spout can be swivelled with respect to the each other;

the coupler comprising:
 a section with left-hand threads formed and located thereon for complementary engagement with the left-hand threads of the head;
 a section with right-hand threads formed and located thereon for complementary engagement with the right-hand threads of the spout;
 an unthreaded section formed and located on the coupler between the left-hand threads and the right-hand threads thereof adjacent which the left-hand threads of the head may be selectively located; and
 the left-hand threads of the coupler blocking axial removal of the head from the coupler when the left-hand threads of the head are located adjacent the unthreaded section of the coupler.

12. A faucet spout assembly, which comprises:

a spout;

a first fluid inlet passage and a second fluid inlet passage located within the spout;

a fluid outlet passage located in the spout;

a valve mounted on the spout and formed with structure for facilitating selective fluid communication between the first inlet passage or the second inlet passage with the outlet passage;

means for selectively positioning the valve on the spout to obtain the desired direction of the fluid from the first inlet passage or second inlet passage to the outlet passage;

a filter media located in the spout;

a first fluid path located in the spout for directing fluid through the filter media;

a second fluid path located in the spout independently of the first fluid path for directing fluid in a path to bypass the filter media;

the first fluid path being in fluid communication with the first inlet passage; and the second fluid path being in fluid communication with the second inlet passage.

13. A faucet spout assembly, which comprises:

a spout;

a first fluid inlet passage and a second fluid inlet passage located within the spout;

a fluid outlet passage located in the spout;

a valve mounted on the spout and formed with structure for facilitating selective fluid communication between the first inlet passage or the second inlet passage with the outlet passage;

means for selectively positioning the valve on the spout to obtain the desired direction of the fluid from the first inlet passage or second inlet passage to the outlet passage;

the spout including a spout shell;

a first space within the spout shell defining a location for supporting a cartridge containing a fluid filter media in position for the flow of fluid therethrough; and a second space within the spout shell defining a path through which fluid can flow to bypass the filter media.

14. A faucet assembly, which comprises:

a first valve for controlling the volume of fluid to be dispensed from the faucet;

a spout assembly connected to the first valve for dispensing the volume of fluid controlled by the faucet valve and for selectively dispensing the fluid in a treated or untreated form;

the spout assembly comprising:
 a spout;
 a first fluid inlet passage for treated fluid and a second fluid inlet passage for untreated fluid located within the spout;
 a fluid outlet passage located in the spout;

a second valve mounted on the spout and formed with structure for facilitating selective fluid communication between the first inlet passage or the second inlet passage with the outlet passage;

means for selectively positioning the valve on the spout to obtain the desired direction of the fluid from the first inlet passage or second inlet passage to the outlet passage;

a filter media located in the spout;

a first fluid path located in the spout for directing fluid through the filter media to provide the treated fluid;

a second fluid path located in the spout independently of the first fluid path for directing fluid in a path to bypass the filter media and thereby to provide the untreated fluid;

the first fluid path being in fluid communication with the first inlet passage; and the second fluid path being in fluid communication with the second inlet passage.

15. A faucet assembly, which comprises:

a first valve for controlling the volume of fluid to be dispensed from the faucet;

a spout assembly connected to the first valve for dispensing the volume of fluid controlled by the faucet valve and for selectively dispensing the fluid in a treated or untreated form;

the spout assembly comprising:

a spout;

a first fluid inlet passage for treated fluid and a second fluid inlet passage for untreated fluid located within the spout;

a fluid outlet passage located in the spout;

a second valve mounted on the spout and formed with structure for facilitating selective fluid communication between the first inlet passage or the second inlet passage with the outlet passage; and means for selectively positioning the valve on the spout to obtain the desired direction of the fluid from the first inlet passage or second inlet passage to the outlet passage;

the spout including a spout shell;

a first space within the spout shell defining a location for supporting a cartridge containing a fluid filter media in position for the flow of fluid therethrough to provide the treated fluid; and a second space within the spout shell defining a path through which fluid can flow to bypass the filter media to provide the untreated fluid.

\* \* \* \* \*